(12) United States Patent
Binh Tran et al.

(10) Patent No.: US 12,221,876 B2
(45) Date of Patent: Feb. 11, 2025

(54) AUTOMATIC IDENTIFICATION OF SHUT-INS OF A WELL

(71) Applicant: Chevron U.S.A. Inc., San Ramon, CA (US)

(72) Inventors: Thomas Thai Binh Tran, Mandeville, LA (US); Cole Ellis Palmer, Covington, LA (US); Alireza Zahedi, Covington, LA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/567,322

(22) PCT Filed: Jan. 25, 2023

(86) PCT No.: PCT/US2023/011544
§ 371 (c)(1),
(2) Date: Dec. 5, 2023

(87) PCT Pub. No.: WO2024/158391
PCT Pub. Date: Aug. 2, 2024

(65) Prior Publication Data
US 2024/0287891 A1    Aug. 29, 2024

(51) Int. Cl.
E21B 47/06    (2012.01)

(52) U.S. Cl.
CPC .......... *E21B 47/06* (2013.01); *E21B 2200/20* (2020.05)

(58) Field of Classification Search
CPC ............................. E21B 47/06; E21B 2200/20
See application file for complete search history.

(56) References Cited

U.S. PATENT DOCUMENTS

| | | | |
|---|---|---|---|
| 9,271,109 B2* | 2/2016 | Kobayashi | H04W 4/70 |
| 10,838,102 B2* | 11/2020 | Suzuki | G06F 17/10 |
| 2004/0010374 A1 | 1/2004 | Raghuraman et al. | |
| 2014/0287686 A1* | 9/2014 | Kobayashi | H04W 4/70 455/41.2 |
| 2019/0302291 A1* | 10/2019 | Lolla | G01V 1/288 |
| 2020/0065677 A1* | 2/2020 | Iriarte Lopez | E21B 49/006 |

(Continued)

OTHER PUBLICATIONS

Nomura, Masahiko. "Processing and interpretation of pressure transient data from permanent downhole gauges." PhD diss., Stanford University, 2006 (Year: 2006).*

(Continued)

*Primary Examiner* — Douglas Kay
(74) *Attorney, Agent, or Firm* — Smith & Woldesenbet Law Group, PLLC

(57) ABSTRACT

A method for identifying shut-ins of a well may include obtaining raw pressure values captured over a period of time, where each of the raw pressure values indicates a pressure at a bottom hole of the well; applying filters to the raw pressure values to generate a plurality of filtered pressure values; identifying initial sequences having monotonically trending values among the plurality of filtered pressure values; splicing adjacent initial sequences; adjusting the start point of at least one of the initial sequences based on derivatives of the filtered pressure values; applying a parametric function to the initial sequences to generate fitted sequences; and applying a pattern recognition to the fitted sequences to generate final sequences.

15 Claims, 19 Drawing Sheets

(56) References Cited

U.S. PATENT DOCUMENTS

2020/0362669 A1    11/2020  Roussel
2021/0301659 A1     9/2021  Al Shahri et al.

OTHER PUBLICATIONS

Hayasi, Mohammad, and Bahram Asisbanpour. "Conformed-to-CAD Design Sloped-Edge Adaptive Splicing." (2012) (Year: 2012).*

Hongping, Shu, and Wei Zhaoyu. "Contour smoothing algorithm based on Bezier curves and application." In 2012 Fourth International Conference on Computational Intelligence and Communication Networks, pp. 283-285. IEEE, 2012 (Year: 2012).*

Masahiko Nomura, Processing and Interpretation of Pressure Transient Data From Permanent Downhole Gauges, a dissertation submitted to the Department of Energy Resources Engineering and the Committee on Graduate Studies of Stanford University, Sep. 2006, 48 pages included by International Search Authority.

Kari Rodriquez, Written Opinion of the International Search Authority, May 2, 2023, 7 pages, US as receiving office.

* cited by examiner

AUTOMATIC IDENTIFICATION OF SHUT-INS OF A WELL

CROSS-REFERENCE TO RELATED APPLICATIONS

This application claims priority under 35 U.S.C. § 119 to International Application Number PCT/US23/11544, titled "AUTOMATIC IDENTIFICATION OF SHUT-INS OF A WELL" and filed on Jan. 25, 2023, the entire contents of which are hereby incorporated herein by reference.

TECHNICAL FIELD

The present application is related to subterranean field operations and, more particularly, to automatic identification of shut-ins of a well.

BACKGROUND

Accurate interpretation of pressure events during subterranean operations impact a number of decisions, both in real time and long term, with respect to a well. One such pressure event is a shut-in of a well. For example, petroleum engineering workflows (e.g., pressure transient analysis/rate transient analysis (PTA/RTA)) that are used to characterize a subterranean reservoir and well productivity rely heavily on whether certain pressure events are actual shut-ins. As another example, surveillance, analysis, and optimization (SA&O) of a well and field performance can be impacted when shut-ins of a well are not identified and/or incorrectly identified. As yet another example, regulatory and reporting requirements related to a well can be adversely impacted when shut-ins of a well are not identified and/or incorrectly identified.

SUMMARY

In general, in one aspect, the disclosure relates to a method for identifying shut-ins of a well. The method can include obtaining a plurality of raw pressure values captured over a period of time, where each of the plurality of raw pressure values indicates a pressure at a bottom hole of the well. The method can also include applying a plurality of filters to the plurality of raw pressure values to generate a plurality of filtered pressure values. The method can further include identifying a plurality of initial sequences comprising monotonically trending values among the plurality of filtered pressure values, where each of the plurality of initial sequences includes a start point and an end point. The method can also include splicing adjacent initial sequences among the plurality of initial sequences. The method can further include adjusting the start point of at least one of the plurality of initial sequences based on derivatives of the filtered pressure values. The method can also include applying a parametric function to the plurality of initial sequences to generate a plurality of fitted sequences, where the plurality of fitted sequences includes the plurality of initial sequences less initial sequences falling outside a tolerance of the parametric function. The method can further include applying a pattern recognition to the plurality of fitted sequences to generate a plurality of final sequences, where the plurality of final sequences includes the plurality of final sequences less fitted sequences falling outside a tolerance of the pattern recognition.

In another aspect, the disclosure relates to a system for identifying shut-ins of a well, where the system includes a controller that is configured to obtain a plurality of raw pressure values captured over a period of time, where each of the plurality of raw pressure values indicates a pressure at a bottom hole of the well. The controller of the system can also be configured to apply, using a filter module of the controller, a plurality of filters to the plurality of raw pressure values to generate a plurality of filtered pressure values. The controller of the system can further be configured to identify, using a sequence identification module of the controller, a plurality of initial sequences comprising monotonically trending values among the plurality of filtered pressure values, where each of the plurality of initial sequences includes a start point and an end point. The controller of the system can also be configured to splice, using a splicing module of the controller, adjacent initial sequences among the plurality of initial sequences. The controller of the system can further be configured to adjust the start point of at least one of the plurality of filtered pressure values based on derivatives of the filtered pressure values. The controller of the system can also be configured to apply a parametric function to the plurality of initial sequences to generate a plurality of fitted sequences, where the plurality of fitted sequences includes the plurality of initial sequences less initial sequences falling outside a tolerance of the parametric function. The controller of the system can further be configured to apply pattern recognition to the plurality of fitted sequences to generate a plurality of final sequences, where the plurality of final sequences includes the plurality of fitted sequences less fitted sequences falling outside a tolerance of the pattern recognition.

In yet another aspect, the disclosure relates to a non-transitory computer readable medium comprising computer readable program code, which when executed by a computer processor, enables the computer processor to: facilitate applying a plurality of filters to a plurality of raw pressure values to generate a plurality of filtered pressure values, where the plurality of raw pressure values represent pressures at a bottom hole of a well over a period of time; facilitate identifying a plurality of initial sequences comprising monotonically trending values among the plurality of filtered pressure values, where each of the plurality of initial sequences includes a start point and an end point; facilitate splicing adjacent initial sequences among the plurality of initial sequences; facilitate adjusting the start point of at least one of the plurality of filtered pressure values based on derivatives of the filtered pressure values; facilitate applying a parametric function to the plurality of initial sequences to generate a plurality of fitted sequences, where the plurality of fitted sequences includes the plurality of initial sequences less initial sequences falling outside a tolerance of the parametric function; and facilitate applying pattern recognition to the plurality of fitted sequences to generate a plurality of final sequences, where the plurality of final sequences includes the plurality of fitted sequences less fitted sequences falling outside a tolerance of the pattern recognition.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1A:
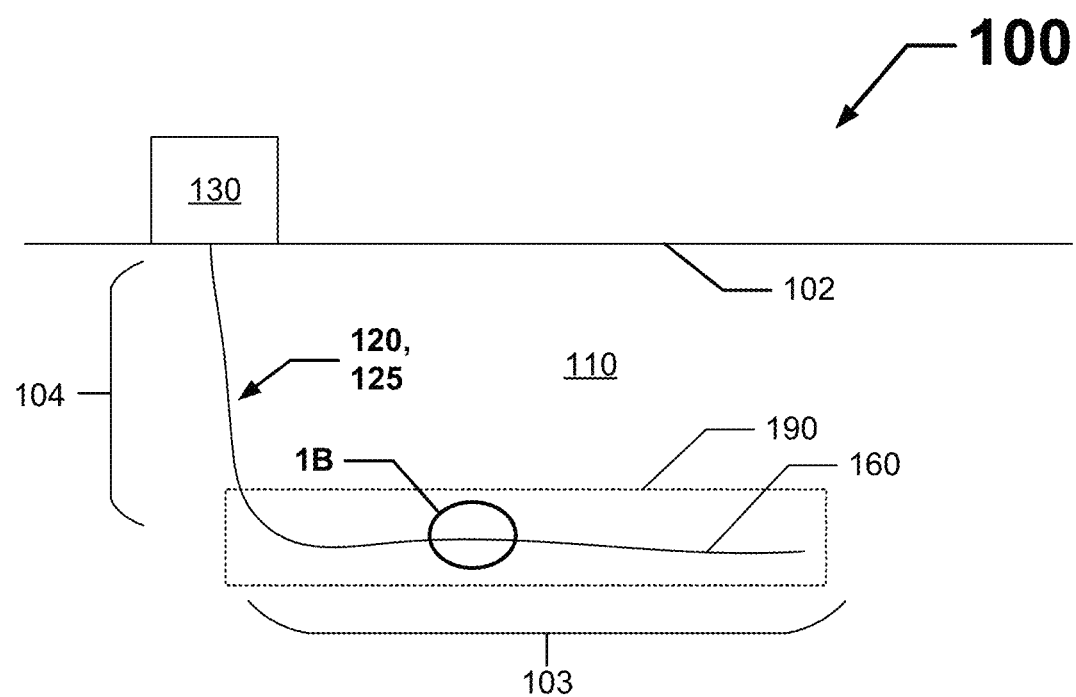
FIGS. 1A through 1C show a field system, and details thereof, with which example embodiments may be used.

The example embodiments discussed herein are directed to systems, apparatus, methods, and devices for automatic identification of shut-ins of a well. The subterranean resources captured using example embodiments may include, but are not limited to, oil and natural gas. Creating one or more wellbores with induced fractures and/or using such wellbores with example embodiments may be designed to comply with certain standards and/or requirements. Example embodiments may be used for wellbores drilled in conventional and/or unconventional (e.g., tight shale) subterranean formations and reservoirs. Example embodiments of automatic identification of shut-ins of a well may be used for production wells or injection (e.g., saltwater disposal (SWD), carbon capture and/or sequestration) wells.

The use of the terms "about", "approximately", and similar terms applies to all numeric values, whether or not explicitly indicated. These terms generally refer to a range of numbers that one of ordinary skill in the art would consider as a reasonable amount of deviation to the recited numeric values (i.e., having the equivalent function or result). For example, this term may be construed as including a deviation of ±10 percent of the given numeric value provided such a deviation does not alter the end function or result of the value. Therefore, a value of about 1% may be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

A "subterranean formation" refers to practically any volume under a surface. For example, it may be practically any volume under a terrestrial surface (e.g., a land surface), practically any volume under a seafloor, etc. Each subsurface volume of interest may have a variety of characteristics, such as petrophysical rock properties, reservoir fluid properties, reservoir conditions, hydrocarbon properties, or any combination thereof. For example, each subsurface volume of interest may be associated with one or more of: temperature, porosity, salinity, permeability, water composition, mineralogy, hydrocarbon type, hydrocarbon quantity, reservoir location, pressure, etc. Those of ordinary skill in the art will appreciate that the characteristics are many, including, but not limited to: shale gas, shale oil, tight gas, tight oil, tight carbonate, carbonate, vuggy carbonate, unconventional (e.g., a permeability of less than 25 millidarcy (mD) such as a permeability of from 0.000001 mD to 25 mD)), diatomite, geothermal, mineral, etc. The terms "formation", "subsurface formation", "hydrocarbon-bearing formation", "reservoir", "subsurface reservoir", "subsurface area of interest", "subsurface region of interest", "subsurface volume of interest", and the like may be used synonymously. The term "subterranean formation" is not limited to any description or configuration described herein.

A "well" or a "wellbore" refers to a single hole, usually cylindrical, that is drilled into a subsurface volume of interest. A well or a wellbore may be drilled in one or more directions. For example, a well or a wellbore may include a vertical well, a horizontal well, a deviated well, and/or other type of well. A well or a wellbore may be drilled in the subterranean formation for exploration and/or recovery of resources. A plurality of wells (e.g., tens to hundreds of wells) or a plurality of wellbores are often used in a field depending on the desired outcome.

A well or a wellbore may be drilled into a subsurface volume of interest using practically any drilling technique and equipment known in the art, such as geosteering, directional drilling, etc. Drilling the well may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling tools, wireline tools, logging-while-drilling (LWD) tools, or other downhole tools. After drilling to a predetermined depth, the drill string and the drill bit may be removed, and then the casing, the tubing, and/or other equipment may be installed according to the design of the well. The equipment to be used in drilling the well may be dependent on the design of the well, the subterranean formation, the hydrocarbons, and/or other factors.

A well may include a plurality of components, such as, but not limited to, a casing, a liner, a tubing string, a sensor, a packer, a screen, a gravel pack, artificial lift equipment (e.g., an electric submersible pump (ESP)), and/or other components. If a well is drilled offshore, the well may include one or more of the previous components plus other offshore components, such as a riser. A well may also include equipment to control fluid flow into the well, control fluid flow out of the well, or any combination thereof. For example, a well may include a wellhead, a choke, a valve, and/or other control devices. These control devices may be located on the surface, in the subsurface (e.g., downhole in the well), or any combination thereof. In some embodiments, the same control devices may be used to control fluid flow into and out of the well. In some embodiments, different control devices may be used to control fluid flow into and out of a well. In some embodiments, the rate of flow of fluids through the well may depend on the fluid handling capacities of the surface facility that is in fluidic communication with the well. The equipment to be used in controlling fluid flow into and out of a well may be dependent on the well, the subsurface region, the surface facility, and/or other factors. Moreover, sand control equipment and/or sand monitoring equipment may also be installed (e.g., downhole and/or on the surface). A well may also include any completion hardware that is not discussed separately. The term "well" may be used synonymously with the terms "borehole," "wellbore," or "well bore." The term "well" is not limited to any description or configuration described herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

If a component of a figure is described but not expressly shown or labeled in that figure, the label used for a corresponding component in another figure may be inferred to that component. Conversely, if a component in a figure is labeled but not described, the description for such component may be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of automatic identification of shut-ins of a well will be described more fully hereinafter with reference to the accompanying drawings, in which example embodiments of automatic identification of shut-ins of a well are shown. Automatic identification of shut-ins of a well may, however, be embodied in many different forms and should not be construed as limited to the example embodiments set forth herein. Rather, these example embodiments are provided so that this disclosure will be thorough and complete, and will fully convey the scope of automatic identification of shut-ins of a well to those of ordinary skill in the art. Like, but not necessarily the same, elements (also sometimes called components) in the various figures are denoted by like reference numerals for consistency.

Terms such as "first", "second", "primary," "secondary," "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. This list of terms is not exclusive. Such terms are not meant to denote a preference or a particular orientation, and they are not meant to limit embodiments of automatic identification of shut-ins of a well. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
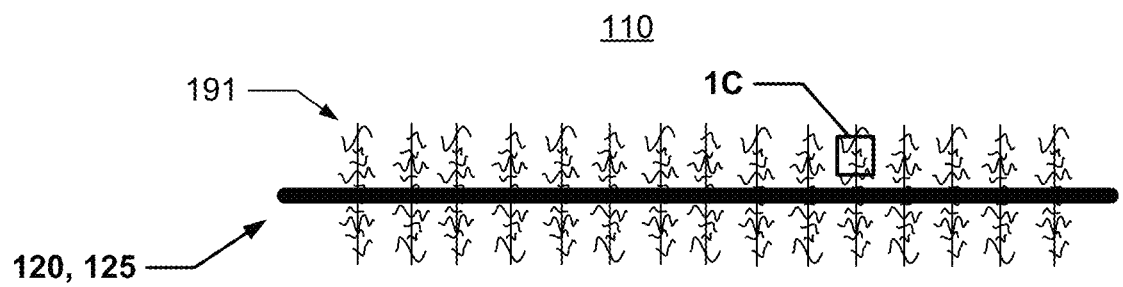
Figure 1C:
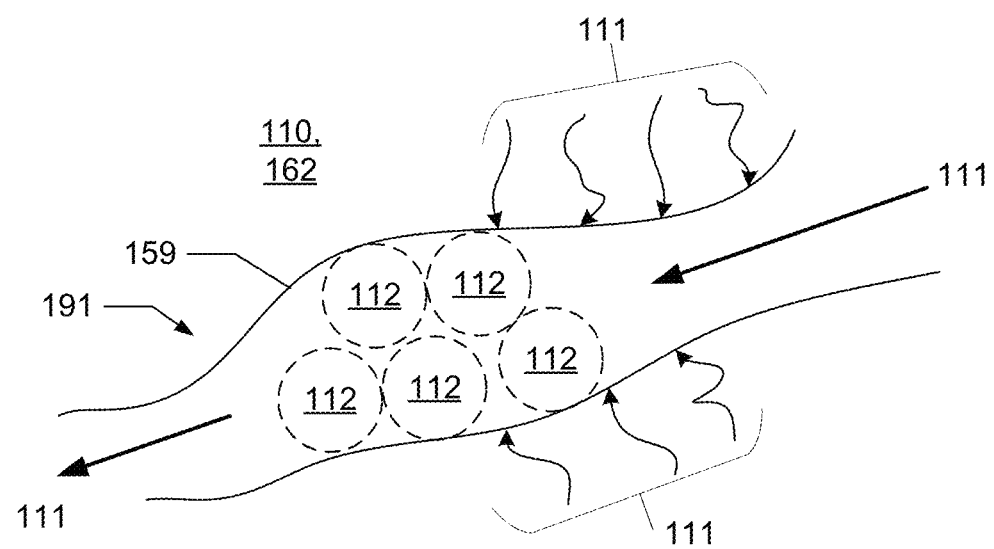

FIG. 1A shows of a field system 100 with a subterranean wellbore 120 in which example embodiments may be used. FIG. 1B shows a detail of a substantially horizontal section 103 of the wellbore 120 of FIG. 1A. FIG. 1C shows a detail of an induced fracture 191 of FIG. 1B. Referring to FIGS. 1A through 1C, the wellbore 120 of the field system 100 in this example is bounded by a wall in the subterranean formation 110 and formed using field equipment 130. The field equipment 130 may be located above a surface 102, and/or within the wellbore 120. The surface 102 may be ground level for an on-shore application (as in this case) and the sea floor for an off-shore application. The point where the wellbore 120 begins at the surface 102 may be called the entry point.

The subterranean formation 110 may include one or more of a number of formation types, including but not limited to shale, limestone, sandstone, clay, sand, and salt. In certain embodiments, some or all of the subterranean formation 110 may be unconventional as that term is known by those of ordinary skill in the art. For example, a subterranean formation 110 that is unconventional has a permeability and/or porosity that is so low that the subterranean resource 111 (e.g., oil, natural gas) cannot be extracted economically through a vertical section 104 of the wellbore 120 and instead requires a horizontal section 103 of the wellbore 120 that is subjected to fracturing operations. The subterranean formation 110 may include one or more reservoirs in which one or more subterranean resources 111 (e.g., oil, gas, water, steam) may be located. One or more of a number of field operations (e.g., fracturing, coring, tripping, drilling, setting casing, cementing, production, wireline) may be performed using the field equipment 130 to reach an objective of a user with respect to the subterranean formation 110.

The wellbore 120 may have one or more of a number of segments, where each segment may have one or more of a number of dimensions. Examples of such dimensions may include, but are not limited to, size (e.g., diameter) of the wellbore 120, a curvature of the wellbore 120, a true vertical depth of the wellbore 120, a measured depth of the wellbore 120, a vertical (or substantially vertical) section of the wellbore 120, a horizontal (or substantially horizontal) section of the wellbore 120, and a horizontal displacement of the wellbore 120. The field equipment 130 may be used to create (e.g., drill) and/or develop (e.g., insert casing pipe, extract downhole materials) the wellbore 120. The field equipment 130 may be positioned and/or assembled at the surface 102. The field equipment 130 may include, but is not limited to, a production system, an injection system, a derrick, a tool pusher, a clamp, a tong, drill pipe, a drill bit, pumps, compressors, mudlogging equipment, a power source, and a casing string 125.

The field equipment 130 may also include one or more devices that measure and/or control various aspects (e.g., direction of wellbore 120, pressure, temperature) of a field operation associated with the wellbore 120. For example, the field equipment 130 may include a wireline tool that is run through the wellbore 120 to provide detailed information (e.g., curvature, azimuth, inclination) throughout the wellbore 120. Such information may be used for one or more of a number of purposes. For example, such information may dictate the size (e.g., outer diameter) of casing pipe (part of the casing string 125) to be inserted at a certain depth in the wellbore 120.

Inserted into and disposed within the wellbore 120 of FIG. 1 are a number of casing pipes that are coupled to each other end-to-end to form the casing string 125. In this case, each end of a casing pipe has mating threads (a type of coupling feature) disposed thereon, allowing a casing pipe to be mechanically coupled to an adjacent casing pipe in an end-to-end configuration. The casing pipes of the casing string 125 may be mechanically coupled to each other directly or using a coupling device, such as a coupling sleeve. In some cases, the casing string 125 is not disposed in the entire wellbore 120. For example, the casing string 125 may disposed from approximately the surface 102 to some other point in the wellbore 120, leaving an open hole portion of the wellbore 120 extends beyond the casing string 125 at the distal end of the wellbore 120.

Each casing pipe of the casing string 125 may have a length and a width (e.g., outer diameter). The length of a casing pipe may vary. For example, a common length of a casing pipe is approximately 40 feet. The length of a casing pipe may be longer (e.g., 60 feet) or shorter (e.g., 10 feet) than 40 feet. The width of a casing pipe may also vary and may depend on the cross-sectional shape of the casing pipe. For example, when the cross-sectional shape of the casing pipe is circular, the width may refer to an outer diameter, an inner diameter, and/or some other form of measurement of the casing pipe. Examples of a width in terms of an outer diameter of a casing pipe may include, but are not limited to, 7 inches, 7⅝ inches, 8⅝ inches, 9⅝ inches, 9⅞ inches, 10¾ inches, 13⅜ inches, and 14 inches.

The size (e.g., width, length) of the casing string 125 may be based on the information gathered using field equipment 130 with respect to the wellbore 120. The walls of the casing string 125 have an inner surface that forms a cavity that traverses the length of the casing string 125. Each casing pipe may be made of one or more of a number of suitable materials, including but not limited to stainless steel. Cement is poured into the wellbore 120 (e.g., through the cavity and then forced upward between the outer surface of the casing string 125 and the wall of the wellbore 120) to adhere the casing string 125 to the wall of the subterranean formation 110. In some cases, a liner may additionally be used with, or alternatively be used in place of, some or all of the casing pipes in the casing string 125.

Figure 3:
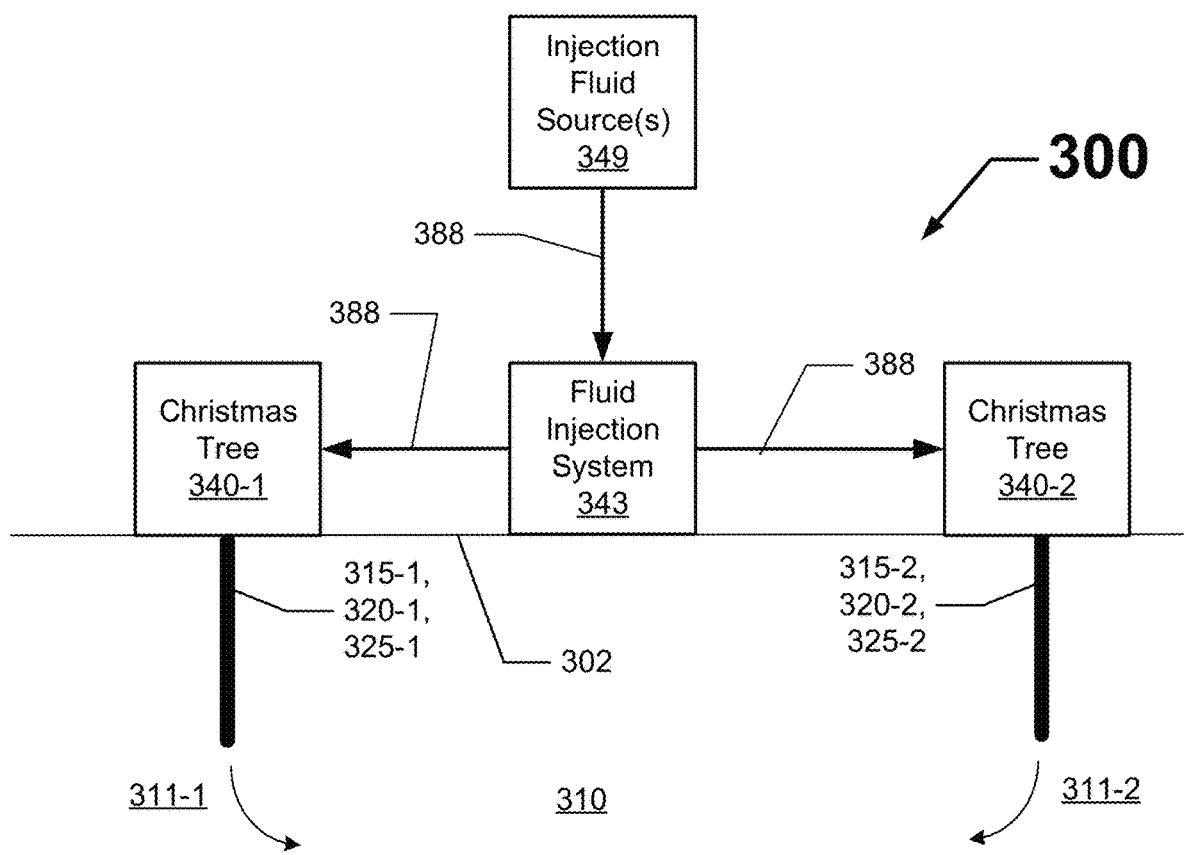
FIG. 3 shows a diagram of a field system that includes multiple injection wells with which example embodiments may be used.

In some cases, as with a wellbore 120 that is used for injection, as shown in FIG. 3 below, a number of tubing pipes that are coupled to each other and inserted inside the cavity formed by the casing string 125 to form a tubing string. The tubing pipes of the tubing string are mechanically coupled to each other end-to-end, usually with mating threads (a type of coupling feature). The tubing pipes of the tubing string may be mechanically coupled to each other directly or using a coupling device, such as a coupling sleeve.

Each tubing pipe of the tubing string may have a length and a width (e.g., outer diameter). The length of a tubing pipe may vary. For example, a common length of a tubing pipe is approximately 30 feet. The length of a tubing pipe may be longer (e.g., 40 feet) or shorter (e.g., 10 feet) than 30 feet. Also, the length of a tubing pipe may be the same as, or different than, the length of an adjacent casing pipe of the casing string 125. The width of a tubing pipe may also vary and may depend on one or more of a number of factors, including but not limited to the target depth of the wellbore 120, the total length of the wellbore 120, a desired flow rate of a fluid therethrough for injection, the inner diameter of the adjacent casing pipe, and the curvature of the wellbore 120.

The width of a tubing pipe may refer to an outer diameter, an inner diameter, and/or some other form of measurement of the tubing pipe. Examples of a width in terms of an outer diameter for a tubing pipe may include, but are not limited to, 7 inches, 5 inches, and 4 inches. The outer diameter of the tubing pipe may be less than the inner diameter of the adjacent casing pipe of the casing string 125, resulting in a gap (also called an annulus) between the tubing string 115 and the adjacent casing string 125. The walls of the tubing pipe have an inner surface that forms a cavity that traverses the length of the tubing string 115. The tubing pipe may be made of one or more of a number of suitable materials, including but not limited to steel.

While not shown in FIG. 1A, there may be multiple wellbores 120, each with its own wellhead but that is located close to the other wellheads, drilled into the subterranean formation 110 and having substantially horizontal sections 103 that are close to each other. In such a case, the multiple wellbores 120 may be drilled at the same pad or at different pads. When the drilling process is complete, other operations, such as fracturing operations, may be performed. A fracturing operation may enhance existing fractures 191 in the subterranean formation 110 and/or create new fractures 191 in the subterranean formation 110. Examples of other operations used with example embodiments may include production and injection.

The fractures 191 shown in FIG. 1B may be naturally-occurring or induced (e.g., through a fracturing operation). The fractures 191 in FIG. 1B in this example are located in the horizontal section 103 of the wellbore 120 in FIG. 1A. The fractures 191, whether induced and/or naturally occurring, may additionally or alternatively be located in other sections (e.g., a substantially vertical section 104, a transition area between a vertical section 104 and a horizontal section 103) of the wellbore 120. The fractures 191 provide paths for formation water, gases, subterranean resources 111, and/or any other components in the subterranean formation 110 to enter the wellbore 120, as shown in FIG. 1C. These paths provided by the fractures 191 may additionally or alternatively allow fluids (e.g., water) to be injected from the wellbore 120 into the subterranean formation 110.

Operations that induce fractures 191 in the subterranean formation 110 use any of a number of fluids that include proppant 112 (e.g., sand, ceramic pellets). When proppant 112 is used, some of the fractures 191 (also sometimes called principal or primary fractures) receive proppant 112, while a remainder of the fractures 191 (also sometimes called secondary fractures) do not have any proppant 112 in them. As shown in FIG. 1C, when proppant 112 is used, the proppant 112 is designed to become lodged inside at least some of the induced fractures 191 to keep those fractures 191 open after the fracturing operation is complete (e.g., during production, during injection). While the shape of the proppant 112 is shown as being uniformly spherical, and the size is substantially identical among the proppant 112, the actual sizes and shapes of the proppant 112 may vary.

The fractures 191 create a volume 190 within the subterranean formation 110 where the rock matrix 162 of the subterranean formation 110 is connected to the high conductivity fractures 191 located a short distance away. In addition to different configurations of the fractures 191, other factors that may contribute to the viability of the subterranean formation 110 may include, but are not limited to, permeability of the rock matrix 162, capillary pressure, and the temperature and pressure of the subterranean formation 110. Each fracture 191, whether induced or naturally occurring, is defined by a wall 159, also called a frac face 159. The frac face 159 provides a transition between the paths formed by the rock matrices 162 in the subterranean formation 110 and the fracture 191. The subterranean resources 111 flow through the paths formed by the rock matrices 162 in the subterranean formation 110 into the fracture 191, and then on to the wellbore 120. Similarly, fluids injected into the wellbore 120 can flow in the opposite direction, through the fractures 191 and the paths formed by the rock matrices 162 in the subterranean formation 110.

In some cases, one or more sensor devices 160 can be installed at some point in the wellbore 120. For example, a sensor device 160 can be positioned at an inflow point of the well 120, (e.g., where the fractures 191 meet the casing string 125 and the wellbore 120). In certain example embodiments, one or more of such sensor devices 160 can be in the form of a pressure gauge to measure pressure at the inflow point of the well 120. Sensor devices 160 are discussed in more detail below with respect to FIG. 4.

Figure 2:
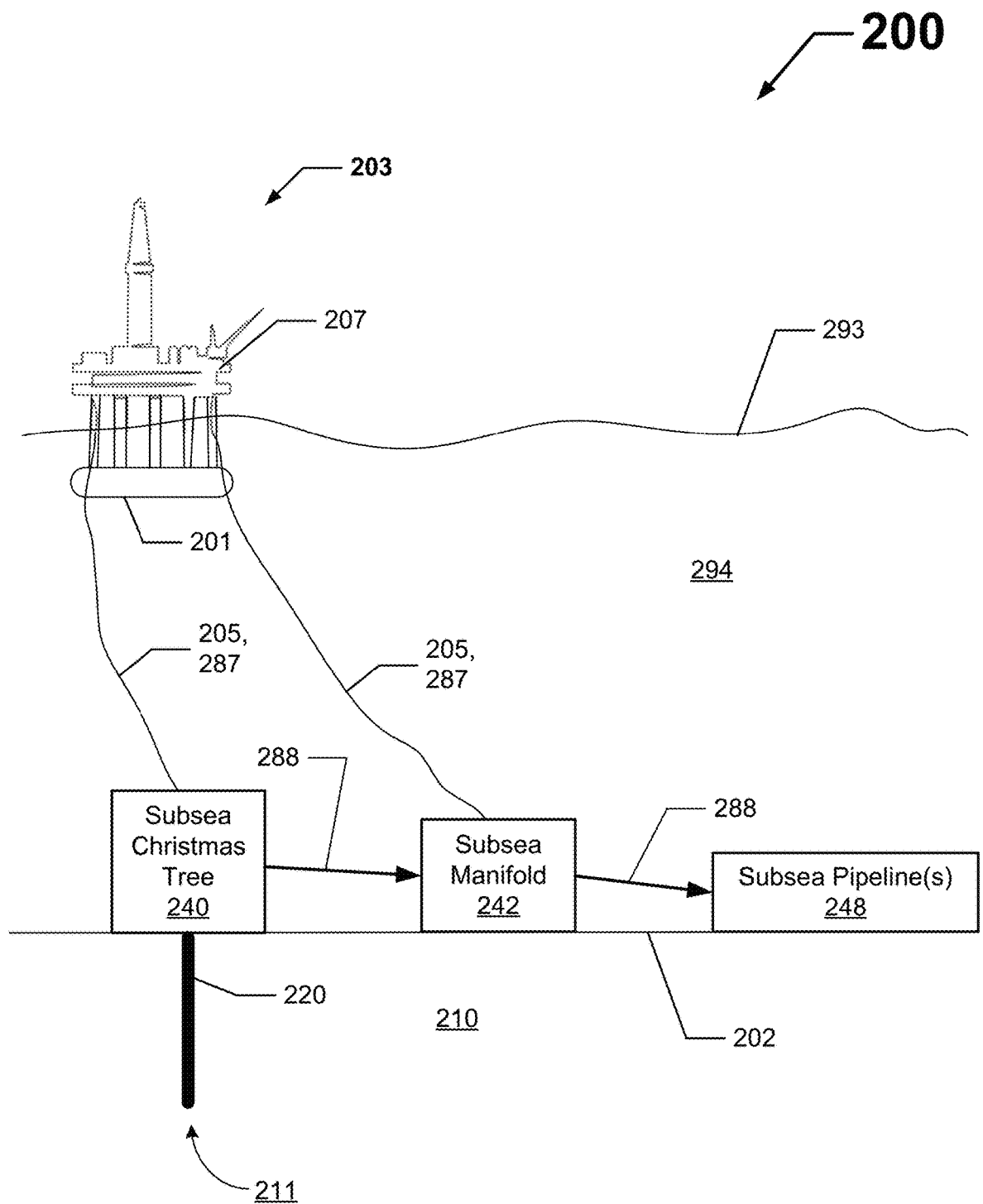
FIG. 2 shows a diagram of a field system that includes a production well with which example embodiments may be used.

FIG. 2 shows a diagram of a field system 200 that includes a production well 220 with which example embodiments may be used. Referring to FIGS. 1A through 2, the field system 200 of FIG. 2 includes a floating structure 203 in the form of a semi-submersible platform that floats in a large and deep body of water 294. Part (e.g., the topsides 207) of the floating structure 203 is above the water line 293, and at least part (e.g., part of the hull 201) of the rest of the floating structure 203 is in the water 294 below the water line 293. The floating structure 203 in this case is used for subterranean field operations (e.g., production, injection) to extract one or more subterranean resources 211 (substantially the same as the subterranean resources 111 discussed above) from and/or inject resources (e.g., carbon dioxide, carbon monoxide, water) into the subterranean formation 210 (substantially the same as the subterranean formation 110 discussed above) via a wellbore 220 (substantially the same as the wellbore 120 discussed above).

In alternative embodiments, as when a subsea operation is close to land, the structure 203 can be land-based rather than floating. In yet other alternative embodiments, all components (e.g., the Christmas tree 240, the manifold 242, the pipelines 248, the piping 288, the structure 203) can be on land and not in the water 294. To extract a subterranean resource 211 from a wellbore 220 on production, a Christmas tree 240 is disposed toward the top of the wellbore 220 at the seabed 202. Piping 288 transfers the subterranean resource 211 from the Christmas tree 240 to a manifold 242. Additional piping 288 transfers the subterranean resource 211 from the manifold 242 to one or more pipelines 248. There can be one or more of a number of components and/or systems (e.g., a pump, a compressor, a process cooler) positioned between a Christmas tree 240 and the pipelines 248 to assist in extracting the subterranean resource 211. There can be one or more communication links 205 and/or power transfer links 287 between one or more of the components (e.g., the Christmas tree 240, the manifold 242, one or more of the pipelines 248) and one or more components (e.g., a generator, a controller) disposed on the topsides 207 of the floating structure 203 (or land-based structure 203, as the case may be).

The Christmas tree 240 is a stack of vertical and horizontal valves, spools, pressure gauges, chokes, and/or other components installed as an assembly on a wellhead. The Christmas tree 240 is configured to provide a controllable interface between the wellbore 220 and production facilities (e.g., via the pipeline 248). The various valves of the Christmas tree 240 can be used for such purposes as testing, servicing, regulating, and/or choking the stream of produced subterranean resources 211 coming up from the wellbore 220.

The manifold 242 is an assembly of headers, pipes (e.g., pipes 288) and valves. The manifold 242 is configured to transfer the subterranean resources 211 from the Christmas tree 240 to one or more of the pipelines 248. In some ways, the manifold 242 acts as a type of flow regulator to distribute the subterranean resource 211 among the various pipelines 248. Similarly, if there are multiple wellbores 220, as from a common pad, the manifold 242 can receive the subterranean resource 211 from one or more of those wellbores 220 and distribute the subterranean resource 211 to one or more of the pipelines 248.

Each pipeline 248 (also sometimes called a submarine pipeline 248) is a series of pipes, coupled end to end, that is laid at or near to the seabed 202. A pipeline 248 moves the subterranean resource 211 from the area of the wellbore 220 to some other location, typically for a midstream process (e.g., oil refining, natural gas processing). The piping 288, also located subsea, can include multiple pipes, ducts, elbows, joints, sleeves, collars, and similar components that are coupled to each other (e.g., using coupling features such as mating threads) to establish a network for transporting the subterranean resource 211 from the Christmas tree 240, through the manifold 242, to one or more of the pipelines 248. Each component of the piping 288 can have an appropriate size (e.g., inner diameter, outer diameter) and be made of an appropriate material (e.g., steel) to safely and efficiently handle the pressure, temperature, flow rate, and other characteristics of the subterranean resource 211 at the depth in the water 294.

Each communication link 205 can include wired (e.g., Class 1 electrical cables, electrical connectors, Power Line Carrier, RS485) and/or wireless (e.g., sound or pressure waves in the water 194, Wi-Fi, Zigbee, visible light communication, cellular networking, Bluetooth, Bluetooth Low Energy (BLE), ultrawide band (UWB), WirelessHART, ISA100) technology. A communication link 205 can transmit signals (e.g., communication signals, control signals, data) from one component (e.g., a controller) of the field system 200 to another (e.g., a valve on the Christmas tree 240).

Each power transfer link 287 can include one or more electrical conductors, which can be individual or part of one or more electrical cables. In some cases, as with inductive power, power can be transferred wirelessly using power transfer links 287. A power transfer link 287 can transmit power from one component (e.g., a battery, a generator) of the system 200 to another (e.g., a motor on the manifold 242). Each power transfer link 287 can be sized (e.g., 12 gauge, 18 gauge, 4 gauge) in a manner suitable for the amount (e.g., 480V, 24V, 120V) and type (e.g., alternating current, direct current) of power transferred therethrough. In this case, the communication links 205 and the power transfer links 287 are in the form of electrical cables.

FIG. 3 shows a diagram of a field system 300 that includes multiple injection wells 320 with which example embodiments may be used. Referring to FIGS. 1A through 3, the field system 300 of FIG. 3 includes two wellbores 320 (wellbore 320-1 and wellbore 320-2), two Christmas trees 340 (Christmas tree 340-1 and Christmas tree 340-2), piping 388, a fluid injection system 343, and one or more injection fluid sources 349. Each wellbore 320 includes a casing string 325 and a tubing string 315 for injection. Specifically, wellbore 320-1 has casing string 325-1 and tubing string 315-1 disposed therein, and wellbore 320-2 has casing string 325-2 and tubing string 315-2 disposed therein. The wellbores 320, the casing strings 325, the tubing strings 315, the Christmas trees 340, and the piping 388 are substantially the same as the wellbores, the casing strings, the tubing strings, the Christmas trees, and the piping discussed above.

The one or more injection fluid sources 349 collect and/or store one or more fluids (e.g., injection gas, injection water) that are injected into one or more of the wellbores 320. An injection fluid source 349 can be naturally occurring or manmade (e.g., a tank, a chamber). The fluid injection system 343 is configured to draw the injection fluid from one or more of the injection fluid sources 349, through the piping 388, and into one or more of the wellbores 320. The fluid injection system 343 can include one or more of a number of components, including but not limited to a valve, a compressor, a motor, a pump, a controller, a sensor device, piping (e.g., piping 388). In this case, the field system 300 is land-based, and so the Christmas trees 340, the injection fluid sources 349, the piping 388, and the fluid injection system 343 are all located at or near the surface 302, which in the case is the ground.

Figure 4:
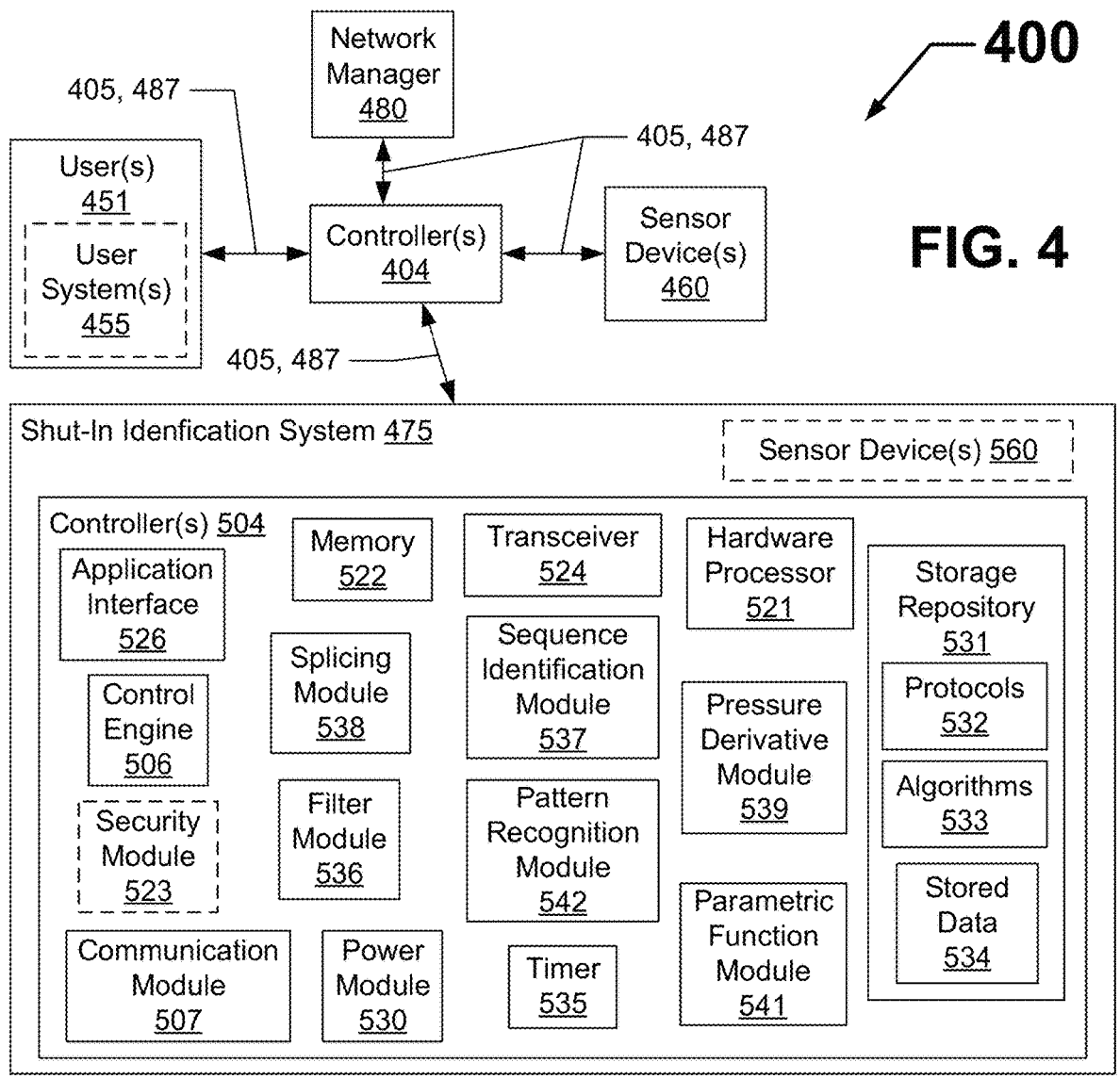
FIG. 4 shows a diagram of a system for identifying shut-ins according to certain example embodiments.

FIG. 4 shows a diagram of a system 400 for automatic identification of shut-ins of a well according to certain example embodiments. The system 400 of FIG. 4 includes a shut-in identification system 475, one or more controllers 404, one or more sensor devices 460, one or more users 451 (including one or more optional user systems 455), and a network manager 480. The system 400 can include other components (e.g., a mud circulation system, a fracturing system, a production system, a PTA/RTA system, a SA&O system, a regulatory and reporting system) that are not shown in FIG. 4 but are considered part of the field equipment 130 of FIG. 1.

The components shown in FIG. 4 are not exhaustive, and in some embodiments, one or more of the components shown in FIG. 4 may not be included in the example system 400. Any component of the system 400 may be discrete or combined with one or more other components of the system 400. Also, one or more components of the system 400 may have different configurations. For example, one or more sensor devices 460 may be disposed within or disposed on other components (e.g., piping, a valve, part of the BHA 101). As another example, a controller 404, rather than being a stand-alone device, may be part of one or more other components (e.g., a mud circulation system, a drilling system) of the system 400.

Referring to FIGS. 1A through 4, the shut-in identification system 475 of the system 400 is configured to identify true or actual shut-ins over time for one or more wells (e.g., wellbore 120). In the current art, software packages are used to attempt to identify shut-ins, but these software packages are highly inaccurate for various reasons. For example, some existing software packages only ask for user input with respect to a minimum shut-in duration and a minimum pressure change. As a result of using these broad parameters to identify shut-ins, the software packages are too blunt and frequently identify false positives. Identifying shut-ins using the example shut-in identification system 475 greatly reduces or eliminates false positives and tends to identify true or actual shut-ins.

The shut-in identification system 475 can include one or more of a number of components. For example, in this case, the shut-in identification system 475 includes one or more controllers 504 and one or more optional sensor devices 560. A controller 504 of the shut-in identification system 475 can include one or more of a number of components. For example, a controller 504 of the shut-in identification system 475 can include a control engine 506, a splicing module 538, a filter module 536, a pattern recognition module 542, a sequence identification module 537, a pressure derivative module 539, a parametric function module 541, a communication module 507, a timer 535, a power module 530, a storage repository 531, a hardware processor 521, a memory 522, a transceiver 524, an application interface 526, and, optionally, a security module 523. The various components of the controller 504 may be centrally located. In addition, or in the alternative, some of the components of the controller 504 may be located remotely from (e.g., in the cloud, at an office building) one or more of the other components of the controller 504.

The storage repository 531 may be a persistent storage device (or set of devices) that stores software and data used to assist the controller 504 in communicating with one or more other components of a system, such as the users 451 (including associated user systems 455), the network manager 480, the sensor devices 460, and any other component of the system 400 of FIG. 4 above. In one or more example embodiments, the storage repository 531 stores one or more protocols 532, one or more algorithms 533, and stored data 534.

The protocols 532 of the storage repository 531 may be any procedures (e.g., a series of method steps) and/or other similar operational processes that the control engine 506 of the controller 504 follows based on certain conditions at a point in time. The protocols 532 may include any of a number of communication protocols that are used to send and/or obtain data between the controller 504 and other components of a system (e.g., the system 400). Such protocols 532 used for communication may be a time-synchronized protocol. Examples of such time-synchronized protocols may include, but are not limited to, a highway addressable remote transducer (HART) protocol, a wirelessHART protocol, and an International Society of Automation (ISA) 100 protocol. In this way, one or more of the protocols 532 may provide a layer of security to the data transferred within a system (e.g., testing system 400). Other protocols 532 used for communication may be associated with the use of Wi-Fi, Zigbee, visible light communication (VLC), cellular networking, BLE, UWB, and Bluetooth.

The algorithms 533 may be any formulas, mathematical models, forecasts, simulations, and/or other similar tools that the control engine 506 of the controller 504 uses to reach a computational conclusion. For example, one or more algorithms 533 may be used, in conjunction with one or more protocols 532, to assist the controller 504 to identify a true or actual shut-in event. As another example, one or more algorithms 533 may be used, in conjunction with one or more protocols 532, to assist the controller 504 to eliminate (e.g., filter out) a pressure event that is not a shut-in. As yet another example, one or more algorithms 533 may be used, in conjunction with one or more protocols 532, to assist the controller 504 to determine a start time and/or a stop time of a shut-in event.

An example of an algorithm 533 is a function or model that outputs a curve used to represent a shut-in event. Another example of an algorithm 533 is a function or model that outputs a deviation (e.g., a percentage) between actual values and a curve generated by another algorithm 533. Yet another example of an algorithm 533 is a function or model that outputs a moving average of pressure over a period of time. Still another example of an algorithm 533 is a function or model that outputs a derivative (e.g., changes in pressure over time).

Stored data 534 may be any data associated with a field (e.g., the subterranean formation 110, the induced fractures 191 within the subterranean formation 110 adjacent to a wellbore 120, the characteristics of proppant 112 used in a field operation), other fields (e.g., other wellbores and subterranean formations), the various components (e.g., the user systems 455, the shut-in identification system 475), including associated equipment (e.g., motors, pumps, compressors), of the system 400, measurements made by the sensor devices (e.g., sensor devices 460, sensor devices 560), threshold values, tables, results of previously run or calculated algorithms 533, updates to protocols 532, user preferences, and/or any other suitable data. Such data may be any type of data, including but not limited to historical data, present data, and future data (e.g., forecasts). The stored data 534 may be associated with some measurement of time derived, for example, from the timer 535.

Examples of a storage repository 531 may include, but are not limited to, a database (or a number of databases), a file system, cloud-based storage, a hard drive, flash memory, some other form of solid-state data storage, or any suitable combination thereof. The storage repository 531 may be located on multiple physical machines, each storing all or a portion of the protocols 532, the algorithms 533, and/or the stored data 534 according to some example embodiments. Each storage unit or device may be physically located in the same or in a different geographic location.

The storage repository 531 may be operatively connected to the control engine 506. In one or more example embodiments, the control engine 506 includes functionality to communicate with the users 451 (including associated user systems 455), the sensor devices 460, the sensor devices 560, the network manager 480, and any other components in the system 400. More specifically, the control engine 506 sends information to and/or obtains information from the storage repository 531 in order to communicate with the users 451 (including associated user systems 455), the sensor devices 460, the sensor devices 560, the network manager 480, and any other components of the system 400. As discussed below, the storage repository 531 may also be operatively connected to the communication module 507 in certain example embodiments.

In certain example embodiments, the control engine 506 of the controller 504 controls the operation of one or more components (e.g., the communication module 507, the timer 535, the transceiver 524) of the controller 504. For example, the control engine 506 may activate the communication module 507 when the communication module 507 is in "sleep" mode and when the communication module 507 is needed to send data obtained from another component (e.g., a sensor device 560, a controller 404) in the system 400. In addition, the control engine 506 of the controller 504 may control the operation of one or more other components (e.g., a sensor device 560, a controller 404), or portions thereof, of the system 400.

The control engine 506 of the controller 504 may communicate with one or more other components of the system 400. For example, the control engine 506 may use one or more protocols 532 to facilitate communication with the sensor devices 560 to obtain data (e.g., measurements of various parameters, such as temperature, pressure, and flow rate), whether in real time or on a periodic basis and/or to instruct a sensor device 560 to take a measurement. The control engine 506 may use measurements of parameters taken by sensor devices 560 to perform one or more steps in identifying a true or actual shut-in event and/or to eliminate a potential shut-in event from consideration using one or more protocols 532 and/or one or more algorithms 533. As yet another example, the control engine 506 may use one or more algorithms 533 and/or protocols 532 to affirmatively identify a pressure event as a shut-in or not a shut-in.

The control engine 506 may generate and process data associated with control, communication, and/or other signals sent to and obtained from the users 451 (including associated user systems 455), the sensor devices 460, the sensor devices 560, the network manager 480, and any other components of the system 400. In certain embodiments, the control engine 506 of the controller 504 may communicate with one or more components of a system external to the system 400. For example, the control engine 506 may interact with an inventory management system by ordering replacements for components or pieces of equipment (e.g., a sensor device 560, a valve, a motor) within the system 400 that has failed or is failing. As another example, the control engine 506 may interact with a contractor or workforce scheduling system by arranging for the labor needed to replace a component or piece of equipment in the system 400. In this way and in other ways, the controller 504 is capable of performing a number of functions beyond what could reasonably be considered a routine task.

In certain example embodiments, the control engine 506 may include an interface that enables the control engine 506 to communicate with the sensor devices 460, the sensor devices 560, the user systems 455, the network manager 480, and any other components of the system 400. For example, if a user system 455 operates under IEC Standard 62386, then the user system 455 may have a serial communication interface that will transfer data to the controller 504. Such an interface may operate in conjunction with, or independently of, the protocols 532 used to communicate between the controller 504 and the users 451 (including corresponding user systems 455), the sensor devices 460, the sensor devices 560, the network manager 480, and any other components of the system 400.

The control engine 506 (or other components of the controller 504) may also include one or more hardware components and/or software elements to perform its functions. Such components may include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The filter module 536 of the controller 504 of the shut-in identification system 475 may be configured to remove some or all of the "noise" from the raw values that represent pressure at the inflow point of a well (e.g., wellbore 120). These raw values may be measured by one or more of the sensor devices 460 and/or one or more of the sensor devices 560. In addition, or in the alternative, these raw values may be calculated using one or more algorithms 533. The filter module 536 may be configured to apply multiple (e.g., two, three, five) different filters to the raw values.

Each filter used by the filter module 536 may be or include one or more algorithms 533 and/or one or more protocols 532. One example of a filter used by the filter module 536 may be a wavelet filter. Another example of a filter used by the filter module 536 may be a moving average filter. The filter module 536 may be utilized on a time series (e.g., a continuous time series, an interval time series) of raw values. The raw values used by the filter module 536 may be with respect to a single well. The output of the filter module 536 can be a series of filtered pressure values. One or more of the algorithms 533 and/or one or more of the protocols 532 used by the filter module 536 can be self-learning, being modified for example based on differences between predicted results and actual results. In certain example embodiments, the output of the filter module 536 can be used by some other component (e.g., a PTA/RTA system, a SA&O system, a regulatory and reporting system) of the system 400 aside from the shut-in identification system 475. An example of the effect of the filter module 536 is shown below with respect to FIG. 7.

The sequence identification module 537 of the controller 504 of the shut-in identification system 475 may be configured to search a time series of pressure values to identify one or more sequences of monotonically trending values. A sequence that is identified by the sequence identification module 537 may have monotonically increasing values (e.g., during shut-in of a production well) or monotonically decreasing values (e.g., during shut-in of an injection well). The time series of pressure values searched by the sequence identification module 537 can be or include the filtered pressure values generated by the filter module 536.

A sequence that is identified by the sequence identification module 537 may be based on a number of values in the sequence. In such a case, the number of values can vary (e.g., more for a steeper slope, less for a relatively flatter slope). The output of the sequence identification module 537 may be called initial sequences or potential shut-in events. Each initial sequence identified by the sequence identification module 537 can include a start point (e.g., in terms of time) and an end point. The sequence identification module 537 may identify initial sequences in real time and/or retroactively. One or more of the algorithms 533 and/or one or more of the protocols 532 used by the sequence identification module 537 may be self-learning, being modified for example based on differences between predicted results and actual results. In certain example embodiments, the output of the sequence identification module 537 may be used by some other component (e.g., a PTA/RTA system, a SA&O system, a regulatory and reporting system) of the system 400 aside from the shut-in identification system 475. An example of the effect of the sequence identification module 537 is shown below with respect to FIGS. 8 and 9.

The splicing module 538 of the controller 504 of the shut-in identification system 475 may be configured to splice adjacent initial sequences. In certain example embodiments, the splicing module 538 may splice adjacent monotonic sequences identified by the sequence identification module 537. The output of the sequence identification module 538 may lead to avoidance of the misidentification of a single long shut-in as a collection of shorter shut-ins. The output of the sequence identification module 538 may be instrumental in handling the splices and remaining noise in the time series. The output of the sequence identification module 538 may identify and eliminate "noise" in the data that survived the implementation of the filter module 536.

For a splice by the splicing module 538 to occur, a rule in one or more of the algorithms 533 used by the splicing module 538 may be to only accept a subsequent initial sequence if the slope of that subsequent initial has a smaller slope (e.g., in the pressure v. time curve) relative to the slope of the immediately preceding initial sequence in the proposed splice. In certain example embodiments, a spliced sequence generated by the splicing module 538 is generated using adjacent initial sequences. There can be tolerances or thresholds (e.g., 30 minutes) that are factored into one or more of the algorithms 533 and/or one or more protocols 532 used by the splicing module 538. In some cases, the splicing module 538 can be used to identify the end of a shut-in event.

The splicing module 538 may splice initial sequences in real time and/or retroactively. One or more of the algorithms 533 and/or one or more of the protocols 532 used by the splicing module 538 may be self-learning, being modified for example based on differences between predicted results and actual results. In certain example embodiments, the output of the splicing module 538 may be used by some other component (e.g., a PTA/RTA system, a SA&O system, a regulatory and reporting system) of the system 400 aside from the shut-in identification system 475. An example of the effect of the splicing module 538 in splicing adjacent initial sequences is shown below with respect to FIGS. 10 through 12.

The pressure derivative module 539 of the controller 504 of the shut-in identification system 475 may be configured to correctly identify (e.g., adjust) the beginning or start point of the pressure build-up (e.g., for production) and/or fall-off (e.g., for injection). The pressure derivative module 539 may identify a start point in real time and/or retroactively. One or more of the algorithms 533 and/or one or more of the protocols 532 used by the pressure derivative module 539 may be self-learning, being modified for example based on differences between predicted results and actual results, the type of well (e.g., deep water well, unconventional well), and/or the type of subterranean formation. In certain example embodiments, the output of the pressure derivative module 539 may be used by some other component (e.g., a PTA/RTA system, a SA&O system, a regulatory and reporting system) of the system 400 aside from the shut-in identification system 475. Some examples of the effect of the pressure derivative module 539 in adjusting a start point are shown below with respect to FIGS. 13 through 18.

The parametric function module 541 of the controller 504 of the shut-in identification system 475 may be configured to normalize the initial sequences to generate fitted sequences. For example, the parametric function module 541 may be configured to mathematically fit a parametric function to each initial sequence (each shut-in candidate). If the residuals between the fitted parametric function and an initial sequence are small (within a range of threshold values), the parametric function module 541 continues to identify the initial sequence as a candidate for a shut-in event and recategorizes the initial sequence as a fitted sequence. If the residuals between the fitted parametric function and an initial sequence are too large (fall outside a range of threshold values), the parametric function module 541 rejects the initial sequence as a candidate for a shut-in event.

The parametric functions (curves) used by the parametric function module 541 may be "classical" or typical curves for different types of shut-ins. Each parametric function used by the parametric function module 541 can be among the algorithms 533 of the storage repository 531. A parametric function can be specific for a type of formation and/or a type of well. In certain example embodiments, a parametric function is or includes an exponential function.

The parametric function module 541 may generate fitted sequences in real time and/or retroactively. One or more of the algorithms 533 and/or one or more of the protocols 532 used by the parametric function module 541 may be self-learning, being modified for example based on differences between predicted results and actual results, the type of well (e.g., deep water well, unconventional well), and/or the type of subterranean formation. In certain example embodiments, the output of the parametric function module 541 may be used by some other component (e.g., a PTA/RTA system, a SA&O system, a regulatory and reporting system) of the system 400 aside from the shut-in identification system 475. Some examples of the effect of the parametric function module 541 in generating a fitted sequence are shown below with respect to FIGS. 19 through 23.

The pattern recognition module 542 of the controller 504 of the shut-in identification system 475 may be configured to apply pattern recognition to the fitted sequences to generate final sequences. In such cases, the final sequences may be the fitted sequences that fall within the pattern recognition templates less the fitted sequences that are discarded for falling outside the pattern recognition templates. In certain example embodiments, the pattern recognition module 542 performs its functions after the parametric function module 541.

Each pattern recognition template may be a pressure profile over a period of time. In certain example embodiments, the pressure profile of each shut-in candidate (each fitted sequence) is compared against the pressure history some period of time (e.g., one day) before the start (e.g., as determined by the pressure derivative module 539) of the shut-in candidate and some period of time (e.g., one day) after the end (e.g., as determined by the splicing module 538) of the shut-in candidate. The period of time before and after the fitted sequence can be the same as each other or different from each other.

The pattern recognition module 542 applies the selected pattern to the fitted sequence as well as the pressures during period of time immediately preceding the fitted sequence and during the period of time immediately following the fitted sequence. The pattern recognition module 542 can allow for the elimination of one or more remaining false positives that were not previously identified and discarded because of, for example, localized abnormal pressure changes.

The pattern recognition module 542 may generate the final sequences in real time and/or retroactively. One or more of the algorithms 533 and/or one or more of the protocols 532 used by the pattern recognition module 542 may be self-learning, being modified for example based on differences between predicted results and actual results, the type of well (e.g., deep water well, unconventional well), and/or the type of subterranean formation. In certain example embodiments, the output of the pattern recognition module 542 may be used by some other component (e.g., a PTA/RTA system, a SA&O system, a regulatory and reporting system) of the system 400 aside from the shut-in identification system 475. Some examples of the effect of the pattern recognition module 542 in generating a final sequence are shown below with respect to FIGS. 24 through 29.

In certain example embodiments, a fitted sequence is considered to fit a pattern (i.e., be considered a final sequence) by the pattern recognition module 542 as long as the fitted sequence, which includes a period of time immediately preceding the fitted sequence and a period of time immediately following the fitted sequence, is within a tolerance (e.g., plus-or-minus 10%, plus-or-minus 25%) of the pattern. In such cases, the tolerance or margin of error allowed can be instantaneous or over periods of time (e.g., running averages every 30 seconds). Also, in such cases, the selected pattern can be among a number of patterns that are stored as stored data 534 and selected by the pattern recognition module 542 based on one or more factors (e.g., depth in the formation, type of formation, duration, type of field operation) associated with the fitted sequence.

In addition, or in the alternative, the pattern recognition module 542 may evaluate a fitted sequence by comparing a pressure value (e.g., the highest pressure value, the lowest pressure value, an average of the pressure values) of the fitted sequence to a pressure value (e.g., the highest pressure value, the lowest pressure value, an average of the pressure values) of the entire pressure sequence (i.e., the pressures during the immediately preceding period of time, the fitted sequence, and the immediately subsequent period of time), the immediately preceding period of time, and/or the immediately subsequent period of time relative to some threshold (e.g., within 5%, within 15%).

For example, if the peak pressure value of the fitted sequence of a production well is 9000 psig and the peak pressure of the period of time (e.g., 24 hours) immediately following the fitted sequence is 12000 psig, the fitted sequence may be rejected by the pattern recognition module 542 because the 33% differential exceeds the threshold differential of 20%. As another example, if the minimum pressure value of the fitted sequence of an injection well is 8000 psig and the peak pressure of the period of time (e.g., 24 hours) immediately following the fitted sequence is 7500 psig, the fitted sequence may be converted to a final sequence by the pattern recognition module 542 because the 6% differential falls within the threshold differential of 10%. In any case, if the pattern recognition module 542 determines that a fitted sequence falls outside the pattern, the fitted sequence is no longer considered to be a potential shut-in event.

The communication module 507 of the controller 504 determines and implements the communication protocol (e.g., from the protocols 532 of the storage repository 531) that is used when the control engine 506 communicates with (e.g., sends signals to, obtains signals from) the user systems 455, the sensor devices 460, the sensor devices 560, the network manager 480, and any other components of the system 400. In some cases, the communication module 507 accesses the stored data 534 to determine which communication protocol is used to communicate with another component of the testing system 400. In addition, the communication module 507 may identify and/or interpret the communication protocol of a communication obtained by the controller 504 so that the control engine 506 may interpret the communication. The communication module 507 may also provide one or more of a number of other services with respect to data sent from and obtained by the controller 504. Such services may include, but are not limited to, data packet routing information and procedures to follow in the event of data interruption.

The timer 535 of the controller 504 may track clock time, intervals of time, an amount of time, and/or any other measure of time. The timer 535 may also count the number of occurrences of an event, whether with or without respect to time. Alternatively, the control engine 506 may perform a counting function. The timer 535 is able to track multiple time measurements and/or count multiple occurrences concurrently. The timer 535 may track time periods based on an instruction obtained from the control engine 506, based on an instruction obtained from a user 451, based on an instruction programmed in the software for the controller 504, based on some other condition (e.g., the occurrence of an event) or from some other component, or from any combination thereof. In certain example embodiments, the timer 535 may provide a time stamp for each packet of data obtained from another component (e.g., a sensor device 560) of the system 400.

The power module 530 of the controller 504 obtains power from a power supply (e.g., AC mains) and manipulates (e.g., transforms, rectifies, inverts) that power to provide the manipulated power to one or more other components (e.g., the timer 535, the control engine 506) of the controller 504, where the manipulated power is of a type (e.g., alternating current, direct current) and level (e.g., 12V, 24V, 120V) that may be used by the other components of the controller 504. In some cases, the power module 530 may also provide power to one or more of the sensor devices 560.

The power module 530 may include one or more of a number of single or multiple discrete components (e.g., transistor, diode, resistor, transformer) and/or a microprocessor. The power module 530 may include a printed circuit board, upon which the microprocessor and/or one or more discrete components are positioned. In addition, or in the alternative, the power module 530 may be a source of power in itself to provide signals to the other components of the controller 504. For example, the power module 530 may be or include an energy storage device (e.g., a battery). As another example, the power module 530 may be or include a localized photovoltaic power system.

The hardware processor 521 of the controller 504 executes software, algorithms (e.g., algorithms 533), and firmware in accordance with one or more example embodiments. Specifically, the hardware processor 521 may execute software on the control engine 506 or any other portion of the controller 504, as well as software used by the users 451 (including associated user systems 455), the network manager 480, and/or other components of the system 400. The hardware processor 521 may be an integrated circuit, a central processing unit, a multi-core processing chip, SoC, a multi-chip module including multiple multi-core processing chips, or other hardware processor in one or more example embodiments. The hardware processor 521 may be known by other names, including but not limited to a computer processor, a microprocessor, and a multi-core processor.

In one or more example embodiments, the hardware processor 521 executes software instructions stored in memory 522. The memory 522 includes one or more cache memories, main memory, and/or any other suitable type of memory. The memory 522 may include volatile and/or non-volatile memory. The memory 522 may be discretely located within the controller 504 relative to the hardware processor 521. In certain configurations, the memory 522 may be integrated with the hardware processor 521.

In certain example embodiments, the controller 504 does not include a hardware processor 521. In such a case, the controller 504 may include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 504 (or portions thereof) to be programmable and function according to certain logic rules and thresholds without the use of a hardware processor. Alternatively, FPGAs, IGBTs, ICs, and/or similar devices may be used in conjunction with one or more hardware processors 521.

The transceiver 524 of the controller 504 may send and/or obtain control and/or communication signals. Specifically, the transceiver 524 may be used to transfer data between the controller 504 and the users 451 (including associated user systems 455), the sensor devices 460, the sensor devices 560, the network manager 480, and any other components of the system 400. The transceiver 524 may use wired and/or wireless technology. The transceiver 524 may be configured in such a way that the control and/or communication signals sent and/or obtained by the transceiver 524 may be obtained and/or sent by another transceiver that is part of a user system 455, a sensor device 460, a sensor device 560, the network manager 480, and/or another component of the system 400. The transceiver 524 may send and/or obtain any of a number of signal types, including but not limited to radio frequency signals.

When the transceiver 524 uses wireless technology, any type of wireless technology may be used by the transceiver 524 in sending and obtaining signals. Such wireless technology may include, but is not limited to, Wi-Fi, Zigbee, VLC, cellular networking, BLE, UWB, and Bluetooth. The transceiver 524 may use one or more of any number of suitable communication protocols (e.g., ISA100, HART) when sending and/or obtaining signals.

Optionally, in one or more example embodiments, the security module 523 secures interactions between the controller 504, the users 451 (including associated user systems 455), the sensor devices 460, the sensor devices 560, the network manager 480, and any other components of the system 400. More specifically, the security module 523 authenticates communication from software based on security keys verifying the identity of the source of the communication. For example, user software may be associated with a security key enabling the software of a user system 455 to interact with the controller 504. Further, the security module 523 may restrict receipt of information, requests for information, and/or access to information.

A user 451 (including an associated user system 455), the sensor devices 460, the network manager 480, and the other components of the testing system 400 may interact with the controller 504 using the application interface 526. Specifically, the application interface 526 of the controller 504 obtains data (e.g., information, communications, instructions, updates to firmware) from and sends data (e.g., information, communications, instructions) to the user systems 455 of the users 451, the sensor devices 460, the network manager 480, and/or the other components of the testing system 400. Examples of an application interface 526 may be or include, but are not limited to, an application programming interface, a web service, a data protocol adapter, some other hardware and/or software, or any suitable combination thereof. Similarly, the user systems 455 of the users 451, the sensor devices 460, the network manager 480, and/or the other components of the testing system 400 may include an interface (similar to the application interface 526 of the controller 504) to obtain data from and send data to the controller 504 in certain example embodiments.

In addition, as discussed above with respect to a user system 455 of a user 451, one or more of the sensor devices 460, the network manager 480, and/or one or more of the other components of the testing system 400 may include a user interface. Examples of such a user interface may include, but are not limited to, a graphical user interface, a touchscreen, a keyboard, a monitor, a mouse, some other hardware, or any suitable combination thereof.

The controller 504, the users 451 (including associated user systems 455), the sensor devices 460, the network manager 480, and the other components of the testing system 400 may use their own system or share a system in certain example embodiments. Such a system may be, or contain a form of, an Internet-based or an intranet-based computer system that is capable of communicating with various software. A computer system includes any type of computing device and/or communication device, including but not limited to the controller 504. Examples of such a system may include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system may correspond to a computer system as described below with regard to FIG. 5.

Further, as discussed above, such a system may have corresponding software (e.g., user system software, sensor device software, controller software). The software may execute on the same or a separate device (e.g., a server, mainframe, desktop personal computer (PC), laptop, PDA, television, cable box, satellite box, kiosk, telephone, mobile phone, or other computing devices) and may be coupled by the communication network (e.g., Internet, Intranet, Extranet, LAN, WAN, or other network communication methods) and/or communication channels, with wire and/or wireless segments according to some example embodiments. The software of one system may be a part of, or operate separately but in conjunction with, the software of another system within the system 400.

As discussed above, the system 400 may include one or more controllers 404. A controller 404 of the system 400 communicates with and in some cases controls one or more of the other components (e.g., a sensor device 460, a PTA/RTA system, a SA&O system, a regulatory and reporting system, a production system, an injection system) of the system 400. A controller 404 performs a number of the same functions that a controller 504 of the shut-in identification system 475 performs. For example, a controller 404 may perform functions that include obtaining and sending data, evaluating data, following protocols, running algorithms, and sending commands. A controller 404 may include one or more of a number of components. Such components of a controller 404 may include, but are not limited to, a control engine, a communication module, a timer, a counter, a power module, a storage repository, a hardware processor, memory, a transceiver, an application interface, and a security module, all of which can be substantially the same as the corresponding components of a controller 504 discussed above. When there are multiple controllers 404 and/or multiple controllers 504, each controller 404 and each controller 504 may operate independently of each other. Alternatively, one or more of the controllers 404 and/or one or more of the controllers 504 may work cooperatively with each other. As yet another alternative, one of the controllers (e.g., a controller 504) may control some or all of one or more other controllers (e.g., controllers 404, controllers 504) in the system 400. Each controller 404 and each controller 504 may be considered a type of computer device, as discussed below with respect to FIG. 5.

Each sensor device 460 and each sensor device 560 includes one or more sensors that measure one or more parameters (e.g., pressure, flow rate, temperature, humidity, fluid content, voltage, current, permeability, porosity, rock characteristics). Examples of a sensor of a sensor device 460 and a sensor device 560 may include, but are not limited to, a temperature sensor, a flow sensor, a pressure sensor, a gas spectrometer, a voltmeter, an ammeter, a permeability meter, a porosimeter, and a camera. A sensor device 460 and/or a sensor device 560 may be integrated with or measure a parameter associated with one or more components of the system 400. For example, a sensor device 560 may be integrated with a tool that is part of the BHA 101 and may be configured to measure a parameter in the form of a bottom hole pressure.

As another example, a sensor device 460 and/or a sensor device 560 may be configured to determine how open or closed a valve within the system 400 is. In some cases, a number of sensor devices 460 and/or sensor devices 560, each measuring a different parameter, may be used in combination to determine and confirm whether a controller 404 and/or a controller 504 should take a particular action (e.g., identify a fitted sequence as a final sequence, operate a valve, report a final sequence to a user 451). When a sensor device 460 or a sensor device 560 includes its own controller (e.g., controller 404 or portions thereof), then the sensor device 460 or the sensor device 560 may be considered a type of computer device, as discussed below with respect to FIG. 5.

A user 451 may be any person that interacts, directly or indirectly, with a controller 404, a controller 504, and/or any other component of the system 400. Examples of a user 451 may include, but are not limited to, a business owner, an engineer, a company representative, a geologist, a consultant, a drilling engineer, a contractor, and a manufacturer's representative. A user 451 may use one or more user systems 455, which may include a display (e.g., a GUI). A user system 455 of a user 451 may interact with (e.g., send data to, obtain data from) a controller 404 and/or a controller 504 via an application interface and using the communication links 405. The user 451 may also interact directly with a controller 404 and/or a controller 504 through a user interface (e.g., keyboard, mouse, touchscreen).

The network manager 480 is a device or component that controls all or a portion (e.g., a communication network, a controller 404, a controller 504) of the system 400. The network manager 480 may be substantially similar to a controller (e.g., controller 404, controller 504), as described above. For example, the network manager 480 may include a controller that has one or more components and/or similar functionality to some or all of a controller 404. Alternatively, the network manager 480 may include one or more of a number of features in addition to, or altered from, the features of a controller (e.g., controller 404, controller 504). As described herein, control and/or communication with the network manager 480 may include communicating with one or more other components of the system 400 and/or another system. In such a case, the network manager 480 may facilitate such control and/or communication. The network manager 480 may be called by other names, including but not limited to a master controller, a network controller, and an enterprise manager. The network manager 480 may be considered a type of computer device, as discussed below with respect to FIG. 5.

Interaction between each controller 404, each controller 504, the sensor devices 460, the sensor devices 560, the users 451 (including any associated user systems 455), the network manager 480, and other components (e.g., a PTA/RTA system, a SA&O system, a regulatory and reporting system, a production system, an injection system, the valves) of the system 400 may be conducted using communication links 405 and/or power transfer links 487. Each communication link 405 may include wired (e.g., Class 1 electrical cables, Class 2 electrical cables, electrical connectors, Power Line Carrier, RS485) and/or wireless (e.g., Wi-Fi, Zigbee, visible light communication, cellular networking, Bluetooth, Bluetooth Low Energy (BLE), ultra-wide band (UWB), WirelessHART, ISA100) technology. A communication link 405 may transmit signals (e.g., communication signals, control signals, data) between each controller 404, each controller 504, the sensor devices 460, the sensor devices 560, the users 451 (including any associated user systems 455), the network manager 480, and the other components of the system 400.

Each power transfer link 487 may include one or more electrical conductors, which may be individual or part of one or more electrical cables. In some cases, as with inductive power, power may be transferred wirelessly using power transfer links 487. A power transfer link 487 may transmit power between each controller 404, each controller 504, the sensor devices 460, the sensor devices 560, the users 451 (including any associated user systems 455), the network manager 480, and the other components of the system 400.

Each power transfer link 487 may be sized (e.g., 12 gauge, 18 gauge, 4 gauge) in a manner suitable for the amount (e.g., 480V, 24V, 120V) and type (e.g., alternating current, direct current) of power transferred therethrough.

Figure 5:
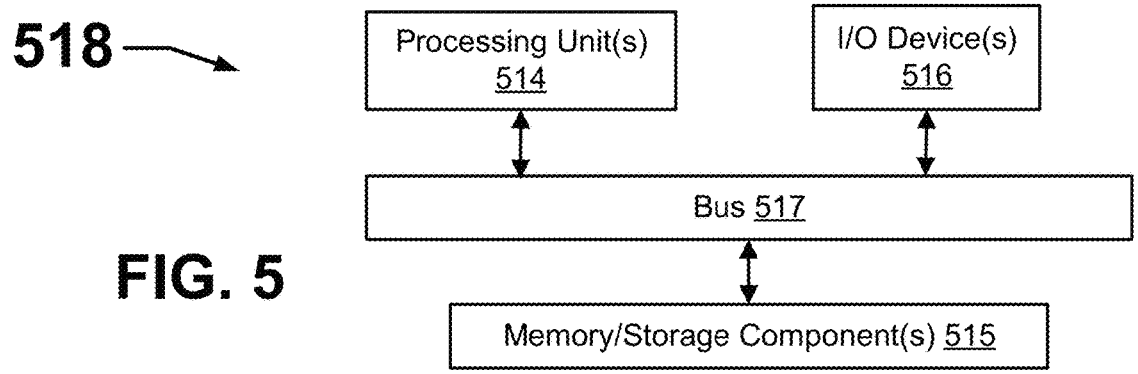
FIG. 5 shows a computing device in accordance with certain example embodiments.

FIG. 5 illustrates one embodiment of a computing device 518 that implements one or more of the various techniques described herein, and which is representative, in whole or in part, of the elements described herein pursuant to certain example embodiments. For example, a controller 504 (including components thereof, such as a control engine 506, a hardware processor 521, a storage repository 531, a power module 530, and a transceiver 524) may be considered a computing device 518. Computing device 518 is one example of a computing device and is not intended to suggest any limitation as to scope of use or functionality of the computing device and/or its possible architectures. Neither should the computing device 518 be interpreted as having any dependency or requirement relating to any one or combination of components illustrated in the example computing device 518.

The computing device 518 includes one or more processors or processing units 514, one or more memory/storage components 515, one or more input/output (I/O) devices 516, and a bus 517 that allows the various components and devices to communicate with one another. The bus 517 represents one or more of any of several types of bus structures, including a memory bus or memory controller, a peripheral bus, an accelerated graphics port, and a processor or local bus using any of a variety of bus architectures. The bus 517 includes wired and/or wireless buses.

The memory/storage component 515 represents one or more computer storage media. The memory/storage component 515 includes volatile media (such as random access memory (RAM)) and/or nonvolatile media (such as read only memory (ROM), flash memory, optical disks, magnetic disks, and so forth). The memory/storage component 515 includes fixed media (e.g., RAM, ROM, a fixed hard drive, etc.) as well as removable media (e.g., a Flash memory drive, a removable hard drive, an optical disk, and so forth).

One or more I/O devices 516 allow a user 451 to enter commands and information to the computing device 518, and also allow information to be presented to the user 160 and/or other components or devices. Examples of input devices 516 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 518 (also sometimes called a computer system 518) is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 518 includes at least the minimal processing, input, and/or output means necessary to practice one or more embodiments.

Further, those skilled in the art will appreciate that one or more elements of the aforementioned computer device 518 is located at a remote location and connected to the other elements over a network in certain example embodiments. Further, one or more embodiments is implemented on a distributed system having one or more nodes, where each portion of the implementation (e.g., the shut-in identification system 475) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 6:
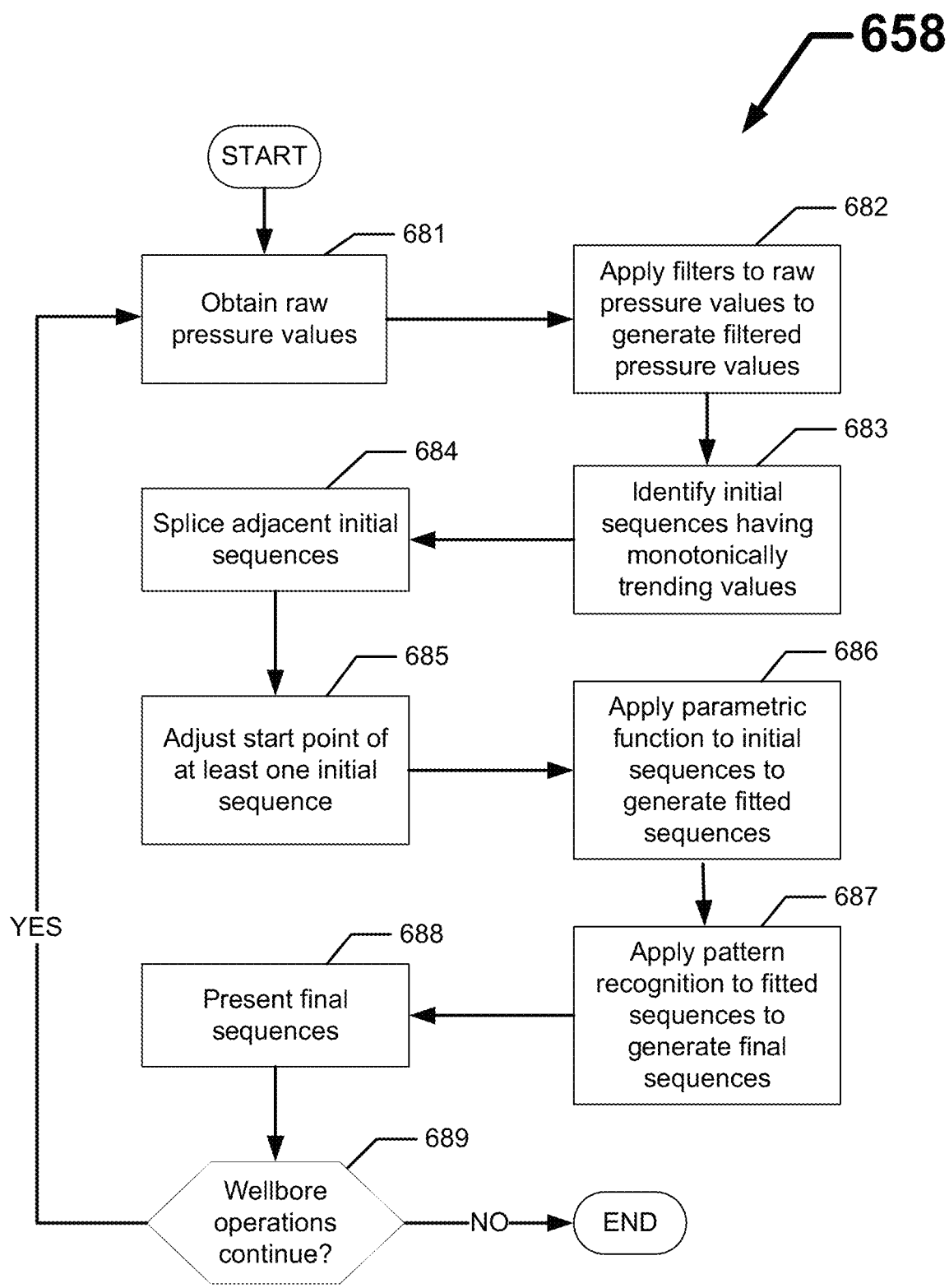
FIG. 6 shows a flowchart of a method for identifying shut-ins according to certain example embodiments.

FIG. 6 shows a flowchart 658 of a method for identifying shut-ins of a well according to certain example embodiments. While the various steps in this flowchart 658 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 6 may be included in performing this method. Accordingly, the specific arrangement of steps should not be construed as limiting the scope. Further, a particular computing device, such as the computing device 518 discussed above with respect to FIG. 5, may be used to perform or facilitate performance of one or more of the steps (or portions thereof) for the method shown in FIG. 6 in certain example embodiments. Any of the functions (or portions thereof) performed below by a controller 504 may involve the use of one or more protocols 532, one or more algorithms 533, and/or stored data 534 stored in a storage repository 531. In addition, or in the alternative, any of the functions (or portions thereof) in the method may be performed by a user (e.g., user 451). In some cases, one or more of the various steps in the method of FIG. 6 can be performed automatically, as by a controller 504 of the shut-in identification system 475.

The method shown in FIG. 6 is merely an example that may be performed by using an example system described herein. In other words, systems for identifying shut-ins of a well may perform other functions using other methods in addition to and/or aside from those shown in FIG. 6. Referring to FIGS. 1A through 6, the method shown in the flowchart 658 of FIG. 6 begins at the START step and proceeds to step 681, where raw pressure values are obtained. As used herein, the term "obtaining" may include receiving, retrieving, accessing, generating, etc. or any other manner of obtaining the information. The raw pressure values may represent the bottom hole pressure of the well 120. Some or all of the raw pressure values may be measured by one or more sensor devices (e.g., sensor device 560). In addition, or in the alternative, some or all of the raw pressure values may be calculated by a controller 504 of the shut-in identification system 475. The raw pressure values can be continuous or discrete over a period of time (e.g., a second, a minute, an hour, a day, a month, a year).

The raw pressure values may be obtained by a controller 504 (or an obtaining component thereof), which may include the controller 504 of FIG. 4 above, using one or more algorithms 533, one or more protocols 532, the communication module 507, the transceiver 524, and/or the application interface 526. The raw pressure values may be obtained from a user 451, including an associated user system 455. In addition, or in the alternative, the raw pressure values may be obtained from one or more sensor devices (e.g., sensor device 560) that measure pressure and/or other various parameters. In step 682, one or more filters are applied to the raw pressure values to generate filtered pressure values. In certain example embodiments, multiple filters are applied serially to the raw pressure values. An example of a filter may be or include a wavelet filter. Another example of a filter may be or include a moving average filter. A filter may be or include one or more algorithms 533 and/or one or more protocols 532. A filter may be selected and run based on one or more of a number of factors, including but not limited to a stage (e.g., completion stage, production stage, injection stage) of a field operation, the origin of the raw pressure values, and the period of time covering the raw pressure values.

Each filter applied to the raw pressure values may be selected and run by the filter module 536 of a controller 504 of the shut-in identification system 475 using one or more algorithms 533 and/or one or more protocols 532. In addition, or in the alternative, a filter may be selected by a user 451 (sometimes through a user system 455). The order in which the various multiple filters are applied to the raw pressure values can be determined by the filter module 536, a user 451, the network manager 480, some other component of the system 400, or any combination thereof. The raw pressure values may be filtered in real time and/or retroactively.

Figure 7:
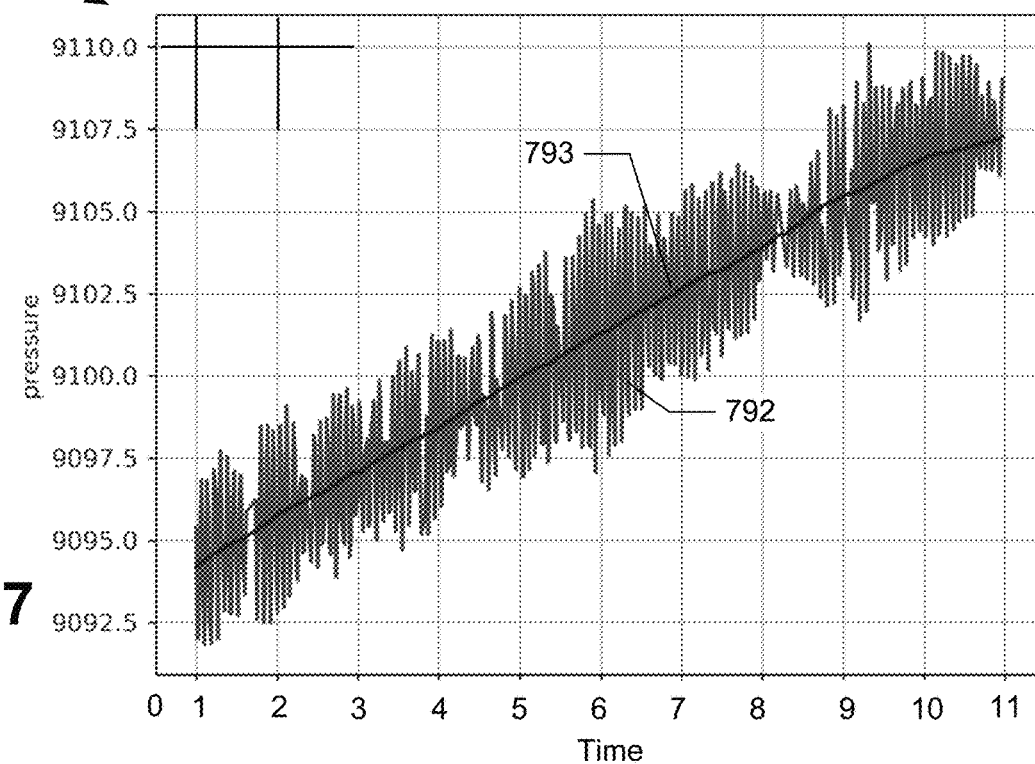
FIG. 7 shows a graph of pressures before and after a filtering stage according to certain example embodiments.

By way of example of the results generated by the filter module 536, FIG. 7 shows a graph 797 of pressures before and after a filtering stage according to certain example embodiments. Specifically, the graph 797 of FIG. 7 shows two plots of bottom hole pressure (e.g., in psig) along the vertical axis versus time (e.g., in seconds, in minutes, in hours, in days) along the horizontal axis. Plot 792 shows the raw pressure values, which can be measured and/or calculated. The raw pressure values in plot 792 are vastly fluctuating (e.g., plus or minus 3 psig) over the entire period of time shown in the graph 797. Plot 793 shows the filtered pressure values after the filter module 536 processes the raw pressure values. The filtered pressure values in plot 793 have significantly lower fluctuations (e.g., plus or minus 0.01 psig) over the entire period of time shown in the graph 797.

Returning to the flowchart 658 of FIG. 6, in step 683, one or more initial sequences having monotonically trending values are identified. Each initial sequence may be identified based on trends in the filtered pressure values generated by the filter module 537. An initial sequence may be identified by the sequence identification module 537 of a controller 504 of the shut-in identification system 475 using one or more algorithms 533 and/or one or more protocols 532. An initial sequence that is identified by the sequence identification module 537 may have monotonically increasing values (e.g., during shut-in of a production well) or monotonically decreasing values (e.g., during shut-in of an injection well).

An initial sequence that is identified by the sequence identification module 537 may be based on a number of filtered pressure values in the sequence. In such a case, the number of filtered pressure values can vary (e.g., more for a steeper slope, less for a relatively flatter slope). Each initial sequence identified by the sequence identification module 537 can include a start point (e.g., in terms of time) and an end point that are defined by the sequence identification module 537. The initial sequences may be identified in real time and/or retroactively.

Figure 8:
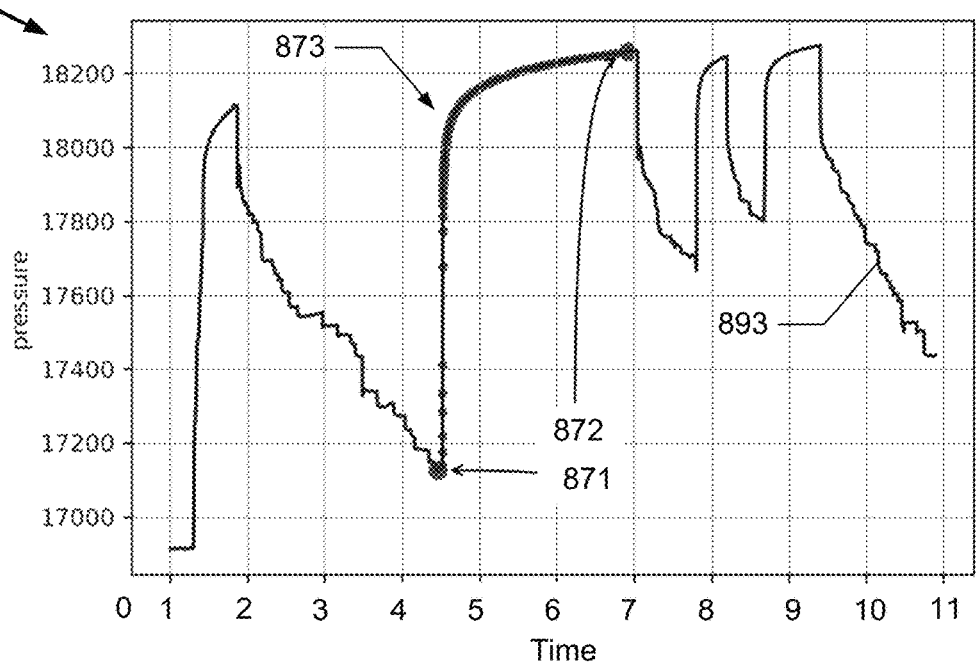
FIG. 8 shows a graph illustrating sequence identification according to certain example embodiments.
Figure 9:
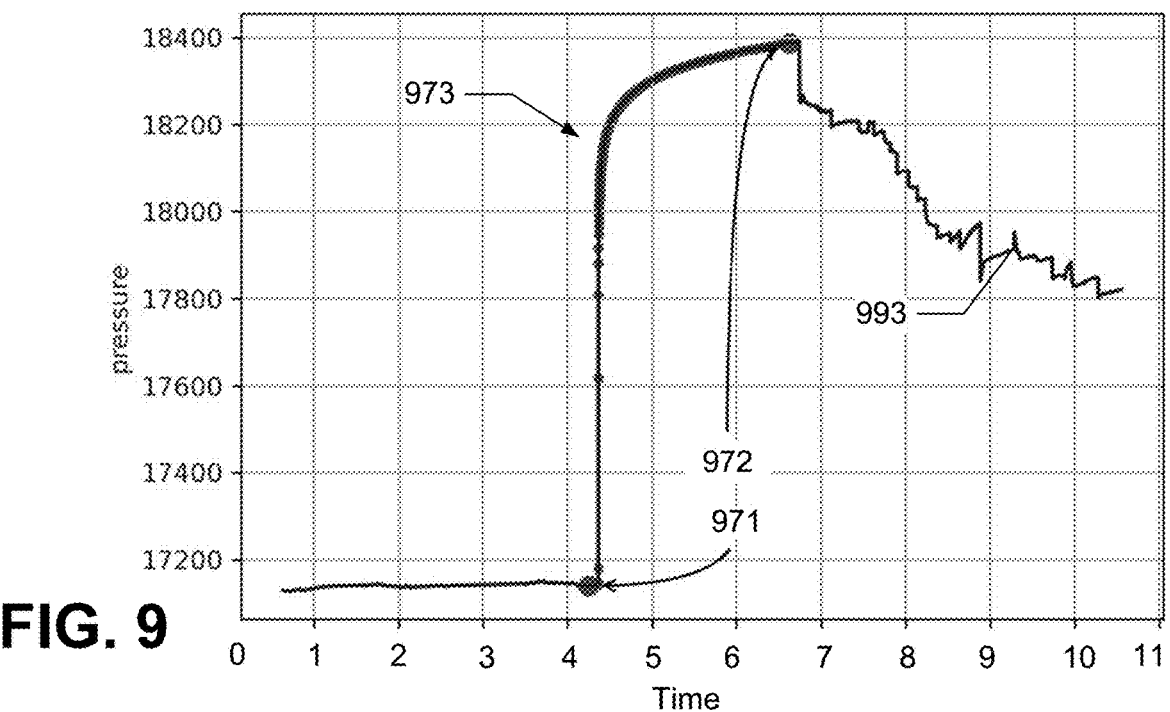
FIG. 9 shows another graph illustrating sequence identification according to certain example embodiments.

By way of example of the results generated by the sequence identification module 537, FIGS. 8 and 9 show graphs illustrating sequence identification according to certain example embodiments. The graph 897 of FIG. 8 shows a plot 893 of filtered pressure values (e.g., in psig) along the vertical axis versus time (e.g., in seconds, in minutes, in hours, in days) along the horizontal axis. The graph 897 shows that there is a start point 871 of an initial sequence 873 (a type of potential shut-in event) at approximately time 4.4 and a pressure of approximately 17120. The graph 897 also shows that there is an end point 872 of the same initial sequence 873 at approximately time 7.0 and a pressure of approximately 18250. The start point 871 and the end point 872 can be identified by the sequence identification module 537. The sequence identification module 537 can also identify the start points (e.g., at time 1.3, at time 7.8, at time 8.7) and other end points (e.g., at time 1.9, at time 8.2, at time 9.4) for other initial sequences that are not expressly shown in the graph 897.

The graph 997 of FIG. 9 shows a plot 993 of filtered pressure values (e.g., in psig) along the vertical axis versus time (e.g., in seconds, in minutes, in hours, in days) along the horizontal axis. The graph 997 shows that there is a start point 971 of an initial sequence 973 (a type of potential shut-in event) at approximately time 4.4 and a pressure of approximately 17120. The graph 897 also shows that there is an end point 972 of the same initial sequence 973 at approximately time 7.0 and a pressure of approximately 18250. The start point 971 and the end point 972 can be identified by the sequence identification module 537.

Returning to the flowchart 658 of FIG. 6, in step 684, one or more adjacent initial sequences are spliced. In certain example embodiments, adjacent initial sequences may be spliced by the splicing module 538 using one or more algorithms 533 and/or one or more protocols 532. In some cases, the adjacent initial sequences are adjacent monotonic sequences identified by the sequence identification module 537 in step 683. Splicing adjacent sequences may eliminate "noise" in the data that survived the implementation of the filter module 536 in step 682.

For a splice by the splicing module 538 to occur during production operations, a rule in one or more of the algorithms 533 used by the splicing module 538 may be to only accept a subsequent initial sequence if the slope of that subsequent initial sequence is smaller (e.g., in the pressure v. time curve) relative to the slope of the immediately preceding initial sequence in the proposed splice. Similarly, for a splice by the splicing module 538 to occur during injection operations, a rule in one or more of the algorithms 533 used by the splicing module 538 may be to only accept a subsequent initial sequence if the slope of that subsequent initial sequence is larger (e.g., in the pressure v. time curve) relative to the slope of the immediately preceding initial sequence in the proposed splice. There can be tolerances or thresholds (e.g., 10 minutes maximum separation between the preceding initial sequence and the subsequent initial sequence) that are factored into one or more of the algorithms 533 and/or one or more protocols 532 used by the splicing module 538. In some cases, the splicing module 538 can be used to identify the end of a shut-in event. The splicing module 538 may splice initial sequences in real time and/or retroactively.

Figure 10:
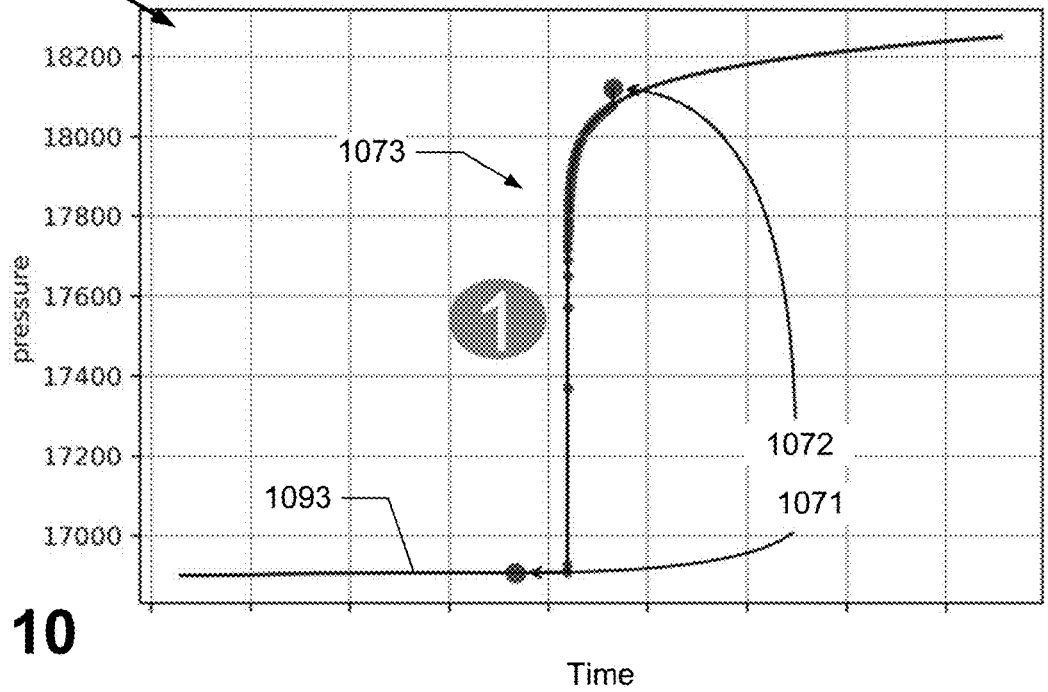
FIGS. 10 through 12 show graphs illustrating splicing according to certain example embodiments.
Figure 11:
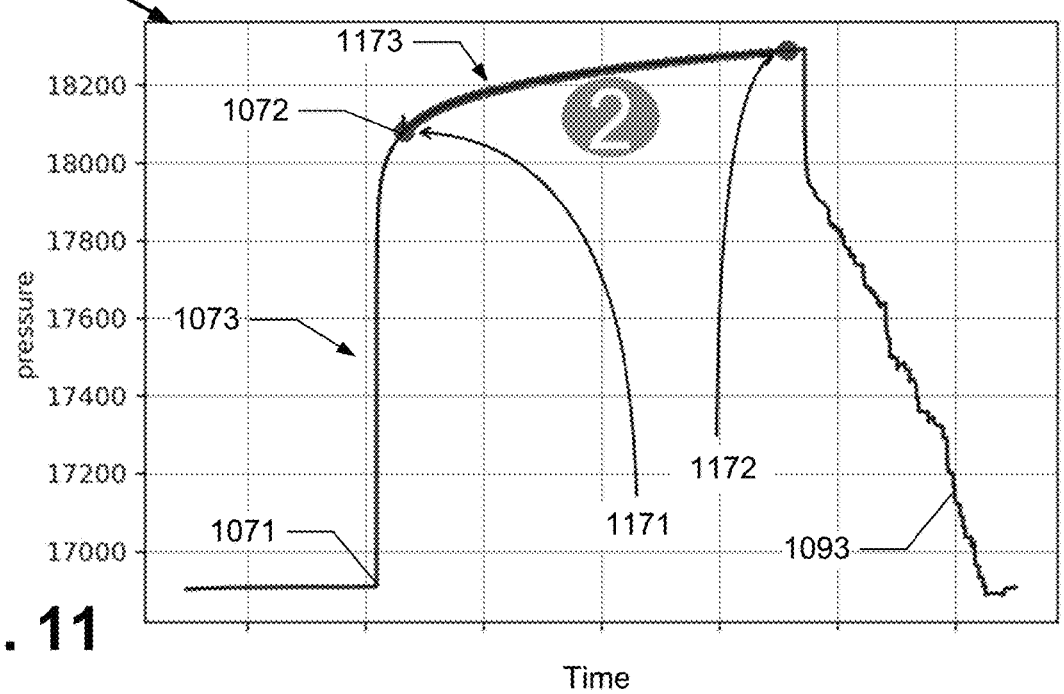
Figure 12:
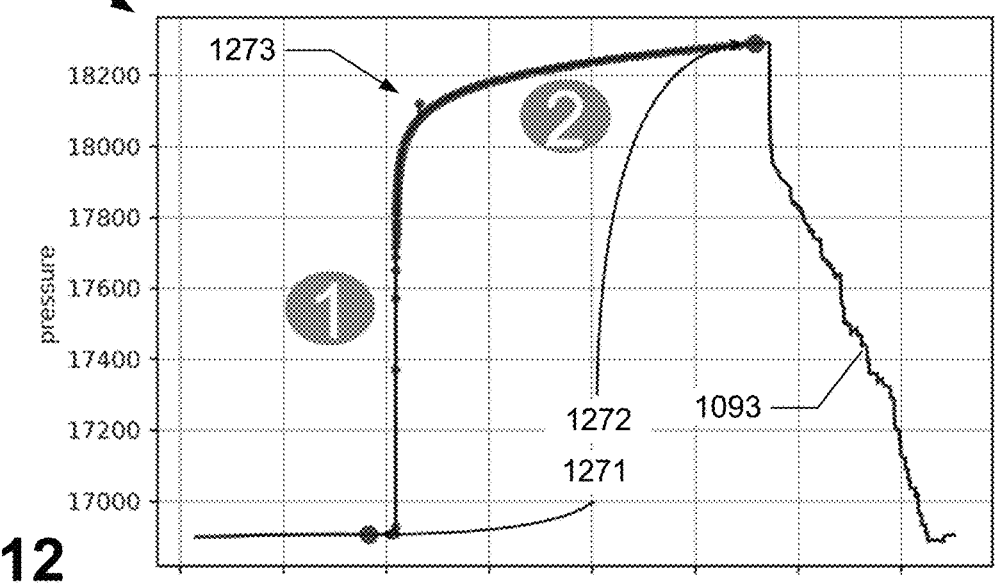

By way of example of the results generated by the splicing module 538, FIGS. 10 through 12 show graphs illustrating splicing according to certain example embodiments. The graph 1097 of FIG. 10 shows a plot 1093 of filtered pressure values (e.g., in psig) along the vertical axis versus time (e.g., in seconds, in minutes, in hours, in days) along the horizontal axis. The graph 1097 shows that there is a start point 1071 of an initial sequence 1073 at a pressure of approximately 16900. The graph 1097 also shows that there is an end point 1072 of the same initial sequence 1073 at a pressure of approximately 18100. The start point 1071 and the end point 1072 may have been previously identified by the sequence identification module 537.

The graph 1197 of FIG. 11 shows the plot 1093 of FIG. 10 extended to a later period of time, with filtered pressure values (e.g., in psig) along the vertical axis and time (e.g., in seconds, in minutes, in hours, in days) along the horizontal axis. The graph 1197 shows the start point 1071 and the end point 1072 of the initial sequence 1073 discussed above in FIG. 10. The graph 1197 of FIG. 11 also shows that there is a start point 1171 of an initial sequence 1173 at a pressure of approximately 18100, where the start point 1171 of the initial sequence 1173 is substantially coincident with the end point 1072 of the initial sequence 1073. The graph 1197 also shows that there is an end point 1172 of the initial sequence 1173 at a pressure of approximately 18300. The start point 1171 and the end point 1172 of the initial sequence 1173 may have been previously identified by the sequence identification module 537.

The graph 1297 of FIG. 12 shows the plot 1093 of FIG. 11 with filtered pressure values (e.g., in psig) along the vertical axis and time (e.g., in seconds, in minutes, in hours, in days) along the horizontal axis. In this case, the splicing module 538 has recognized the initial sequence 1073 of FIG. 10 and the initial sequence 1173 of FIG. 11 as a single initial sequence 1273. One factor in this action by the splicing module 538 may be that the end point 1072 of the initial sequence 1073 and the start point 1171 of the initial sequence 1173 occur at essentially the same time.

In splicing the initial sequence 1073 and the initial sequence 1173 together, the splicing module 538 may discard the prior information associated with the initial sequence 1073 and the initial sequence 1173 in favor of categorizing the initial sequence 1273. For example, as shown by the graph 1297 of FIG. 12, the start point 1071 of the initial sequence 1073 may be recategorized as the start point 1271 of the initial sequence 1273, and the end point 1072 of the initial sequence 1073 may be recategorized as the end point 1272 of the initial sequence 1273. As another example, the designation of end point 1072 and start point 1171 may be discarded after the splicing module 538 identifies the initial sequence 1273.

Returning to the flowchart 658 of FIG. 6, in step 685, the start point of at least one initial sequence is adjusted. In certain example embodiments, the start point of an initial sequence is adjusted based on derivatives of the filtered pressure values. The derivatives of the filtered pressure values can be generated by the pressure derivative module 539 of the controller 504 of the shut-in identification system 475 using one or more algorithms 533 and/or one or more protocols 532. The shut-in identification system 475 can also adjust (e.g., move forward in time, move backward in time) the start point of an initial sequence using one or more algorithms 533 and/or one or more protocols 532. In some cases, the initial sequences are identified by the sequence identification module 537 in step 683.

The pressure derivative module 539 and/or some other part of the controller 504 of the shut-in identification system 475 can determine when a pressure derivative is generated, the threshold values used to determine when a pressure derivative warrants an adjustment to the start point for an initial sequence, and any other variable aspect involved in executing this step 685. There can be tolerances or thresholds (e.g., 5 psi per second) that are factored into one or more of the algorithms 533 and/or one or more protocols 532 used by the pressure derivative module 539. The pressure derivative module 539 may adjust the start point of an initial sequences in real time and/or retroactively.

Figure 13:
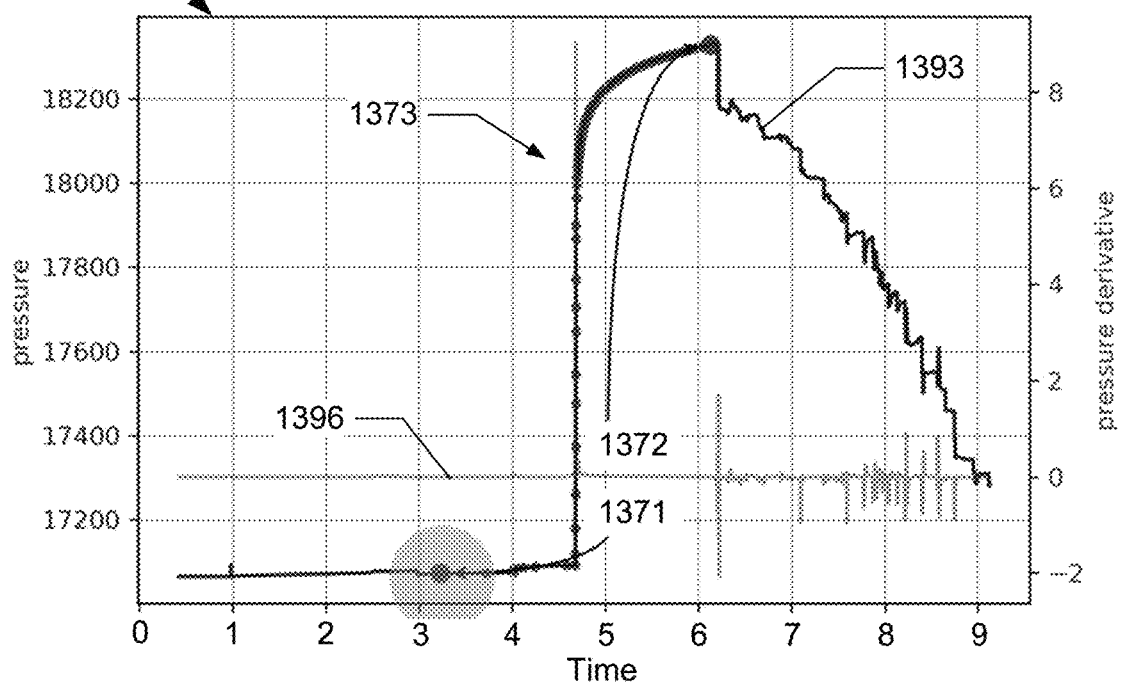
FIGS. 13 through 18 show graphs illustrating start time determination using pressure derivatives according to certain example embodiments.

By way of example of the results generated by the pressure derivative module 539, FIGS. 13 through 18 show graphs illustrating start time determination using pressure derivatives according to certain example embodiments. The graph 1397 of FIG. 13 shows a plot 1393 of filtered pressure values (e.g., in psig) along the left vertical axis, pressure derivative values (e.g., in rate of change in filtered pressure values over time) along the right vertical axis, and time (e.g., in seconds, in minutes, in hours, in days) along the horizontal axis. The graph 1397 shows that there is a start point 1371 of an initial sequence 1373 (a form of a potential shut-in event) at a time of 3.2 and at a pressure of approximately 17075. The graph 1397 also shows that there is an end point 1372 of the same initial sequence 1373 at a time of 6.2 and at a pressure of approximately 18350. The start point 1371 and the end point 1372 may have been previously identified by the sequence identification module 537 and/or the splicing module 538.

The plot 1396 of pressure derivative values in the graph 1397 of FIG. 13 shows that the pressure derivative values from time 0.4 through time 4.7 are substantially constant at 0. At time 4.7, the pressure derivative value spikes to approximately 9. After the spike to time 6.2, the pressure derivative values are again substantially constant at just above 0. At time 6.2, there is another spike in the pressure derivative value from +2 to −2. After time 6.2, the pressure derivative values fluctuate between +1 and −1.

Figure 14:
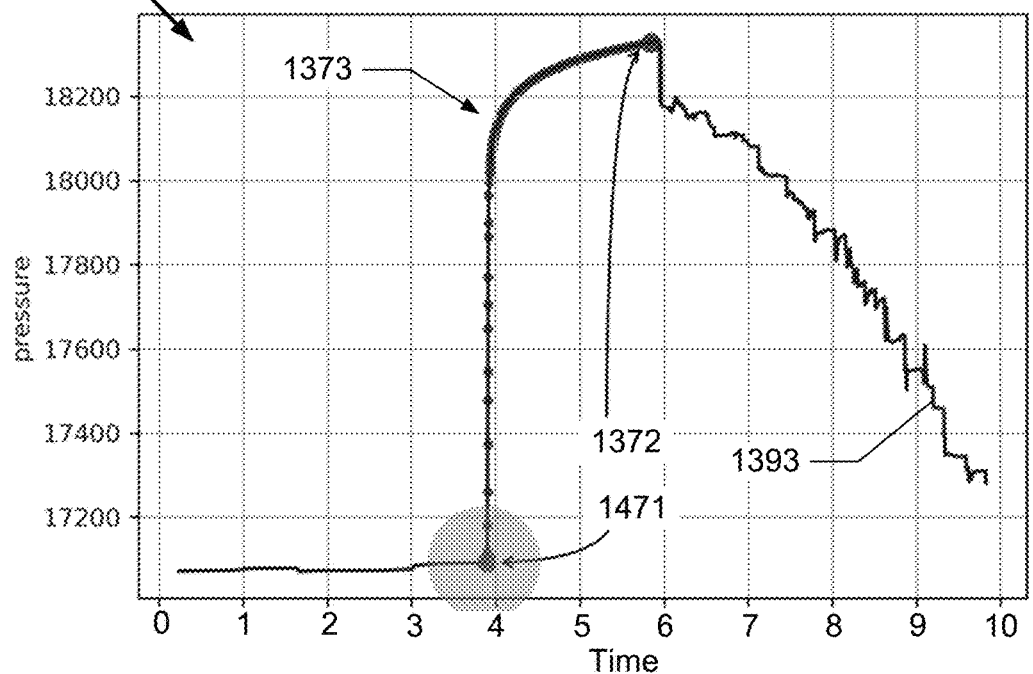

Using the pressure derivative values, the pressure derivative module 539 generates the results shown in the graph 1497 of FIG. 14. The graph 1497 of FIG. 14 shows the plot 1393 of filtered pressure values (e.g., in psig) along the left vertical axis and time (e.g., in seconds, in minutes, in hours, in days) along the horizontal axis. The graph 1497 shows that there is a new start point 1471 of the initial sequence 1373 at a new time of 3.9 and at a pressure of approximately 17075. The graph 1497 also shows that the end point 1372 of the initial sequence 1373 remains at a time of 6.2 and at a pressure of approximately 18350. In other words, the pressure derivative module 539 generated the new start point 1471 at time 4.7 because this coincides with when the pressure derivative value spiked to 9. Since the pressure derivative value at time 3.2, which coincided with the start point 1371 of FIG. 13, is zero, the pressure derivative module 539 discards the start point 1371 and assigns the start point 1471 to the initial sequence 1373.

Figure 15:
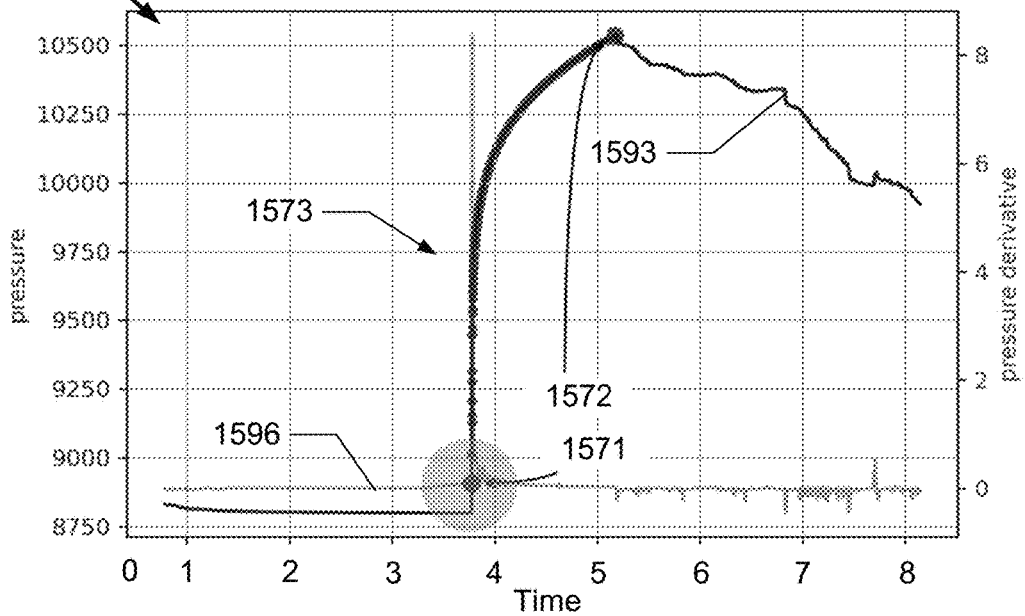

The graph 1597 of FIG. 15 shows a plot 1593 of filtered pressure values (e.g., in psig) along the left vertical axis, pressure derivative values (e.g., in rate of change in filtered pressure values over time) along the right vertical axis, and time (e.g., in seconds, in minutes, in hours, in days) along the horizontal axis. The graph 1597 shows that there is a start point 1571 of an initial sequence 1573 at a time of 3.8 and at a pressure of approximately 8900. The graph 1597 also shows that there is an end point 1572 of the same initial sequence 1573 at a time of 5.2 and at a pressure of approximately 10550. The start point 1571 and the end point 1572 may have been previously identified by the sequence identification module 537 and/or the splicing module 538.

The plot 1596 of pressure derivative values in the graph 1597 of FIG. 15 shows that the pressure derivative values from time 0.6 through time 3.8 are substantially constant at 0. At time 3.8, the pressure derivative value spikes to approximately 8.5. After the spike to time 5.2, the pressure derivative values are again substantially constant at just above 0. At time 5.2, there is another spike in the pressure derivative value to −0.3. After time 5.2, the pressure derivative values fluctuate between +0.5 and −0.5.

Figure 16:
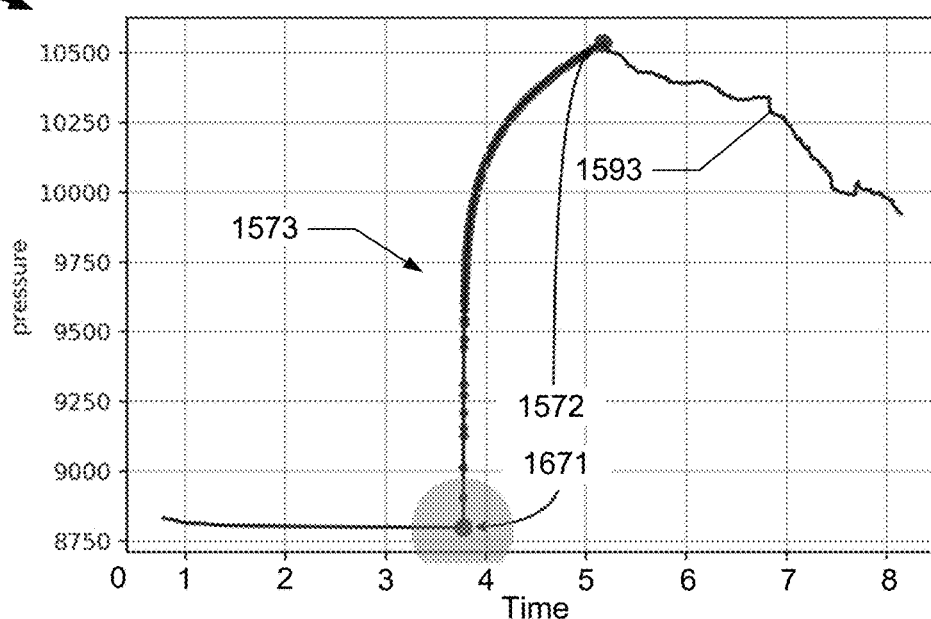

Using the pressure derivative values, the pressure derivative module 539 generates the results shown in the graph 1697 of FIG. 16. The graph 1697 of FIG. 16 shows the plot 1593 of filtered pressure values (e.g., in psig) along the left vertical axis and time (e.g., in seconds, in minutes, in hours, in days) along the horizontal axis. The graph 1697 shows that there is a new start point 1671 of the initial sequence 1573 at substantially the same time of 3.8 but at a new pressure of approximately 8800. The graph 1697 also shows that the end point 1572 of the initial sequence 1573 remains at a time of 5.2 and at a pressure of approximately 10550. In other words, the pressure derivative module 539 generated the new start point 1671 at time 3.8 and pressure 8800 because this coincides with when the pressure derivative value spiked to 8.5. The new start point 1671 is only slightly earlier than the original start point 1571, but the new start point 1671 captures the time and filtered pressure value when the initial sequence 1573 begins. The pressure derivative module 539 may discard the start point 1571 and assign the start point 1671 to the initial sequence 1573.

Figure 17:
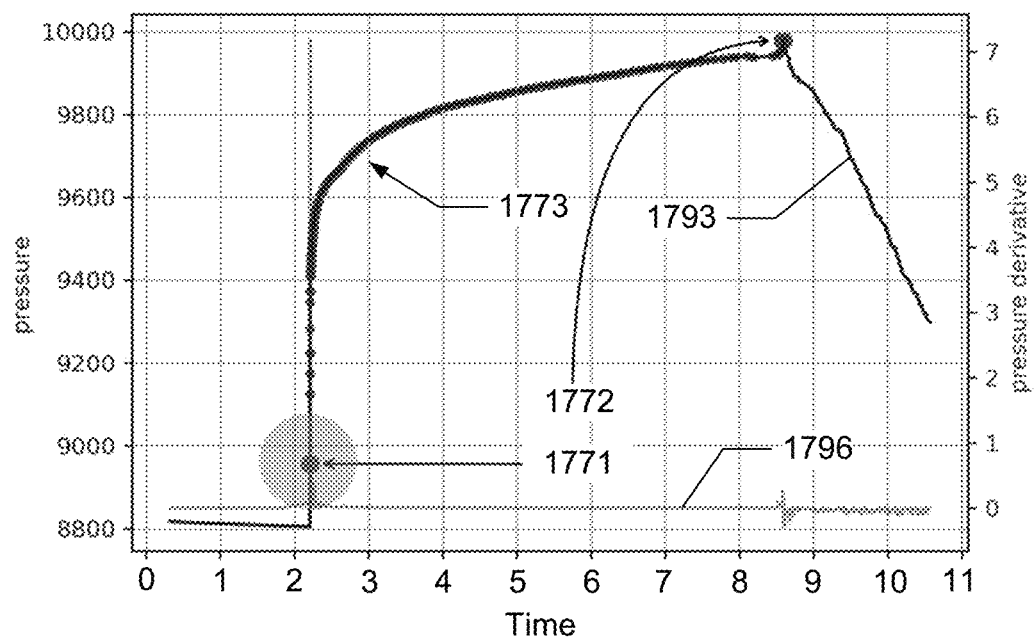

The graph 1797 of FIG. 17 shows a plot 1793 of filtered pressure values (e.g., in psig) along the left vertical axis, pressure derivative values (e.g., in rate of change in filtered pressure values over time) along the right vertical axis, and time (e.g., in seconds, in minutes, in hours, in days) along the horizontal axis. The graph 1797 shows that there is a start point 1771 of an initial sequence 1773 at a time of 2.2 and at a pressure of approximately 8950. The graph 1797 also shows that there is an end point 1772 of the same initial sequence 1773 at a time of 8.5 and at a pressure of approximately 9990. The start point 1771 and the end point 1772 may have been previously identified by the sequence identification module 537 and/or the splicing module 538.

The plot 1796 of pressure derivative values in the graph 1797 of FIG. 17 shows that the pressure derivative values from time 0.3 through time 2.2 are substantially constant at 0. At time 2.2, the pressure derivative value spikes to approximately 7.1. After the spike to time 8.5, the pressure derivative values are again substantially constant at just above 0. At time 8.5, there is another spike in the pressure derivative value between +0.3 and −0.3. After time 8.5, the pressure derivative values fluctuate between 0 and −0.3.

Figure 18:
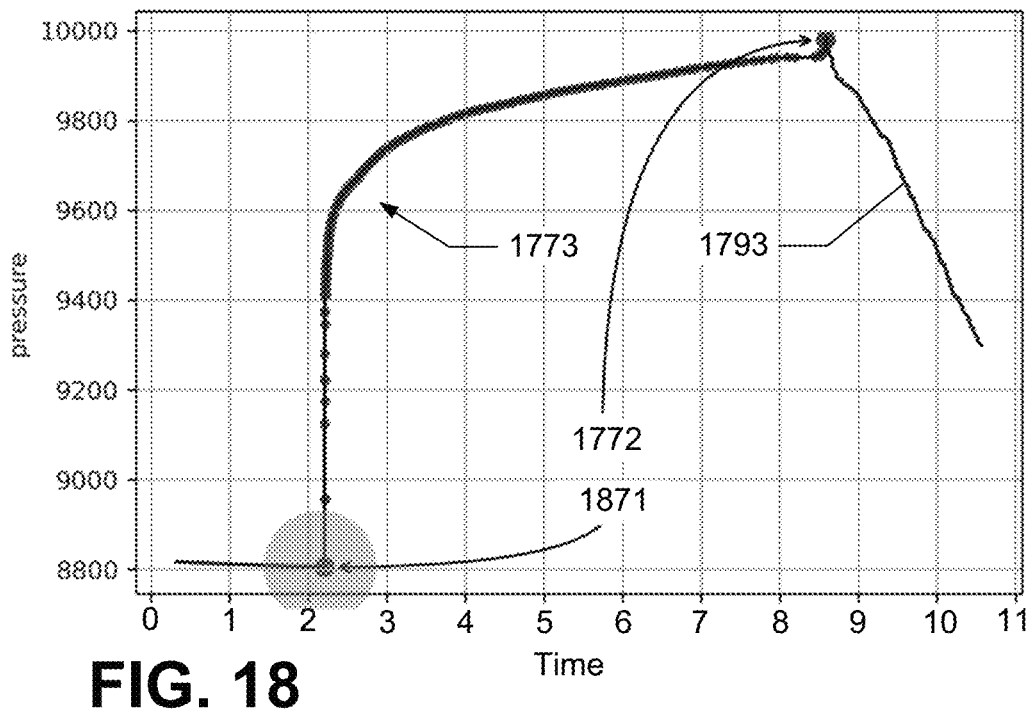

Using the pressure derivative values, the pressure derivative module 539 generates the results shown in the graph 1897 of FIG. 18. The graph 1897 of FIG. 18 shows the plot 1793 of filtered pressure values (e.g., in psig) along the left vertical axis and time (e.g., in seconds, in minutes, in hours, in days) along the horizontal axis. The graph 1897 shows that there is a new start point 1871 of the initial sequence 1773 at substantially the same time of 2.2 but at a new pressure of approximately 8800. The graph 1897 also shows that the end point 1772 of the initial sequence 1773 remains at a time of 8.5 and at a pressure of approximately 9990. In other words, the pressure derivative module 539 generated the new start point 1871 at time 2.2 and pressure 8800 because this coincides with when the pressure derivative value spiked to 7.1. The new start point 1871 is only slightly earlier than the original start point 1771, but the new start point 1871 captures the time and filtered pressure value when the initial sequence 1773 begins. The pressure derivative module 539 may discard the start point 1771 and assign the start point 1871 to the initial sequence 1773.

Returning to the flowchart 658 of FIG. 6, in step 686, one or more parametric functions are applied to the initial sequences to generate fitted sequences. Each parametric function may be or include an algorithm 533. In certain example embodiments, a parametric function may be or include an exponential function. Each parametric function may be applied to the initial sequences by the parametric function module 541 of the controller 504 of the shut-in identification system 475 using one or more algorithms 533 and/or one or more protocols 532. The parametric function module 541 can determine factors such as, but not limited to, which parametric function(s) to apply to a particular initial sequence, the thresholds and/or tolerances to apply to a particular initial sequence, and whether an initial sequence is close enough to a parametric function to recategorize the initial sequence as a fitted sequence. The parametric function module 541 may evaluate an initial sequence relative to a parametric function in real time and/or retroactively.

Figure 19:
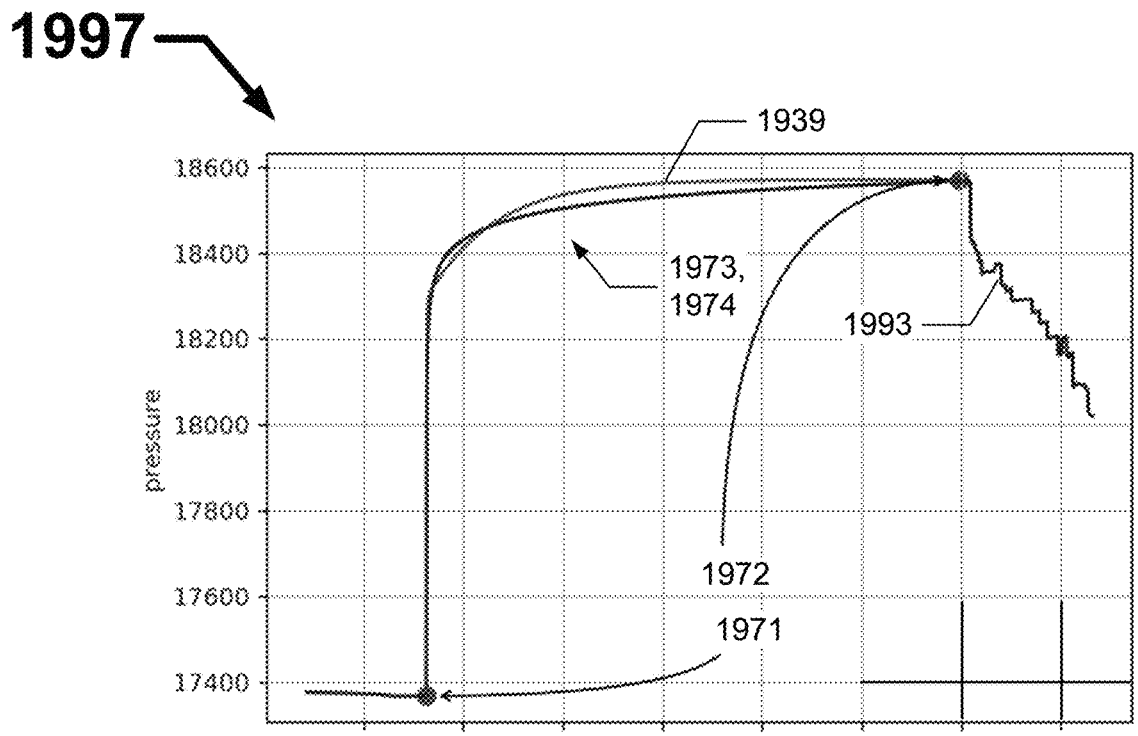
FIGS. 19 through 23 show graphs illustrating parametric function curve fitting according to certain example embodiments.

By way of example of the results generated by the parametric function module 541, FIGS. 19 through 23 show graphs illustrating parametric function curve fitting according to certain example embodiments. The graph 1997 of FIG. 19 shows a plot 1993 of filtered pressure values (e.g., in psig) along the left vertical axis and time (e.g., in seconds, in minutes, in hours, in days) along the horizontal axis. The graph 1997 shows that there is a start point 1971 of an initial sequence 1973 (a form of a potential shut-in event) and an end point 1972. The start point 1971 and the end point 1972 may have been previously identified by the sequence identification module 537, the splicing module 538, and/or the pressure derivative module 539.

The graph 1997 of FIG. 19 also shows a plot 1939 of a parametric function. In this case, the plot 1939 of the parametric function is positioned over the initial sequence 1973 between the start point 1971 and the end point 1972. In this case, the plot 1939 of the parametric function is not entirely coincident with the initial sequence 1973, but any deviations between the two are small enough recategorize the initial sequence 1973 as a fitted sequence 1974. The parametric function module 541 may perform all of these functions.

Figure 20:
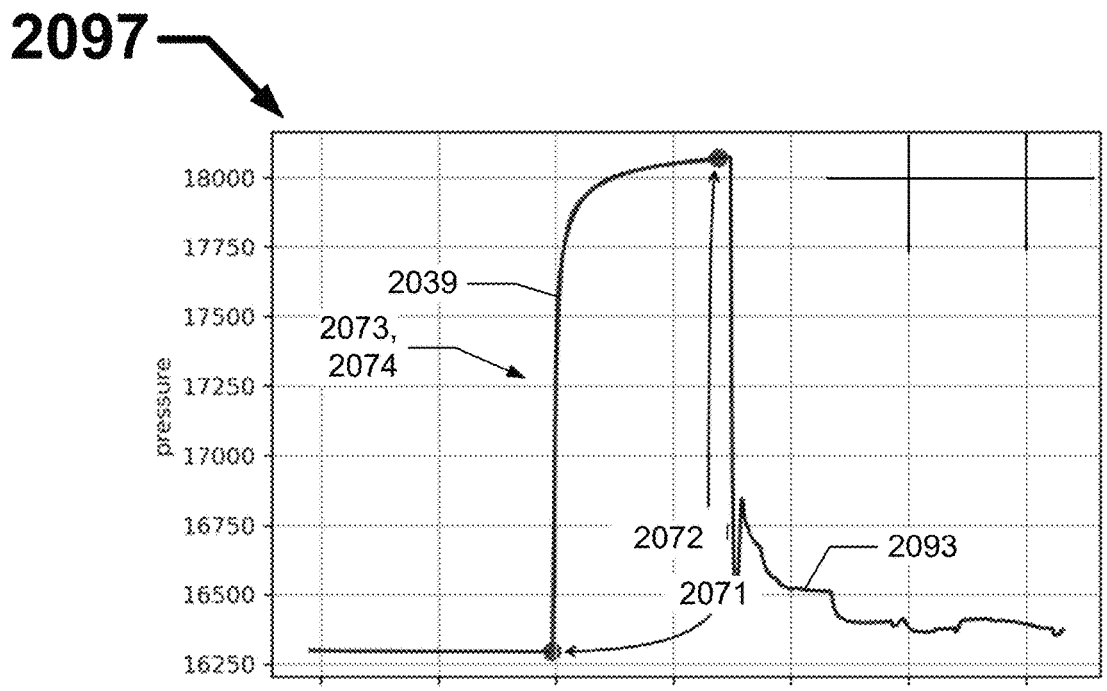

The graph 2097 of FIG. 20 shows a plot 2093 of filtered pressure values (e.g., in psig) along the left vertical axis and time (e.g., in seconds, in minutes, in hours, in days) along the horizontal axis. The graph 2097 shows that there is a start point 2071 of an initial sequence 2073 (a form of a potential shut-in event) and an end point 2072. The start point 2071 and the end point 2072 may have been previously identified by the sequence identification module 537, the splicing module 538, and/or the pressure derivative module 539.

The graph 2097 of FIG. 20 also shows a plot 2039 of a parametric function. In this case, the plot 2039 of the parametric function is positioned over the initial sequence 2073 between the start point 2071 and the end point 2072. In this case, the plot 2039 of the parametric function is entirely coincident with the initial sequence 2073. As a result, the initial sequence 2073 is recategorized as a fitted sequence 2074. The parametric function module 541 may perform all of these functions.

Figure 21:
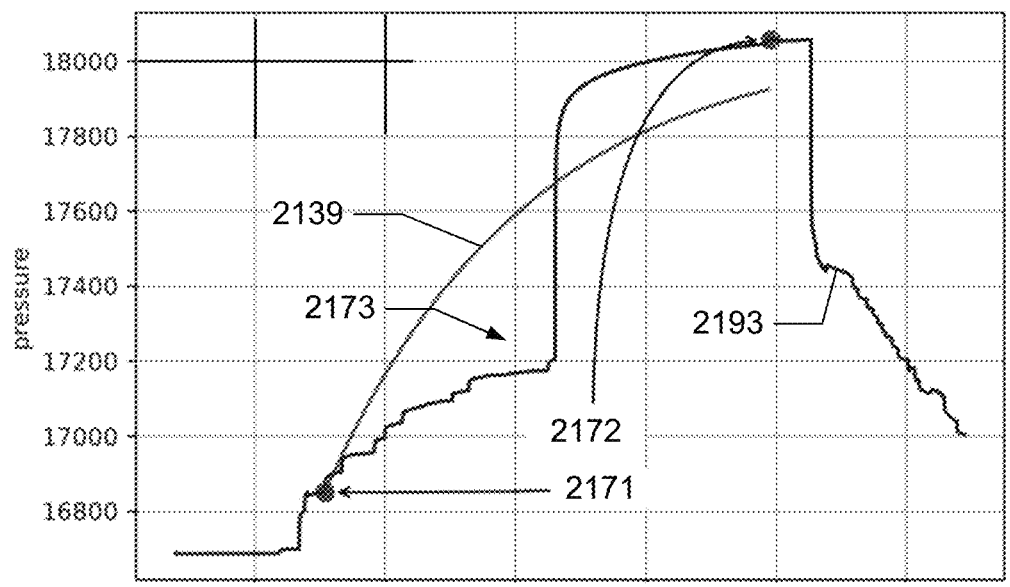

The graph 2197 of FIG. 21 shows a plot 2193 of filtered pressure values (e.g., in psig) along the left vertical axis and time (e.g., in seconds, in minutes, in hours, in days) along the horizontal axis. The graph 2197 shows that there is a start point 2171 of an initial sequence 2173 (a form of a potential shut-in event) and an end point 2172. The start point 2171 and the end point 2172 may have been previously identified by the sequence identification module 537, the splicing module 538, and/or the pressure derivative module 539.

The graph 2197 of FIG. 21 also shows a plot 2139 of a parametric function. In this case, the plot 2139 of the parametric function is positioned over the initial sequence 2173 between the start point 2171 and the end point 2172. In this case, the plot 2139 of the parametric function has significant deviations relative to the initial sequence 2173. As a result, the initial sequence 2173 is rejected as a potential shut-in event and is not recategorized as a fitted sequence. The parametric function module 541 may perform all of these functions. The initial sequence 2173 in this case represents a "soft shut-in", which is not a true shut-in (not wanted for analysis or useable for workflows). Specifically, in this case shown by the initial sequence 2173, the master valve of the well 120 is closed slightly at first, then completely.

Figure 22:
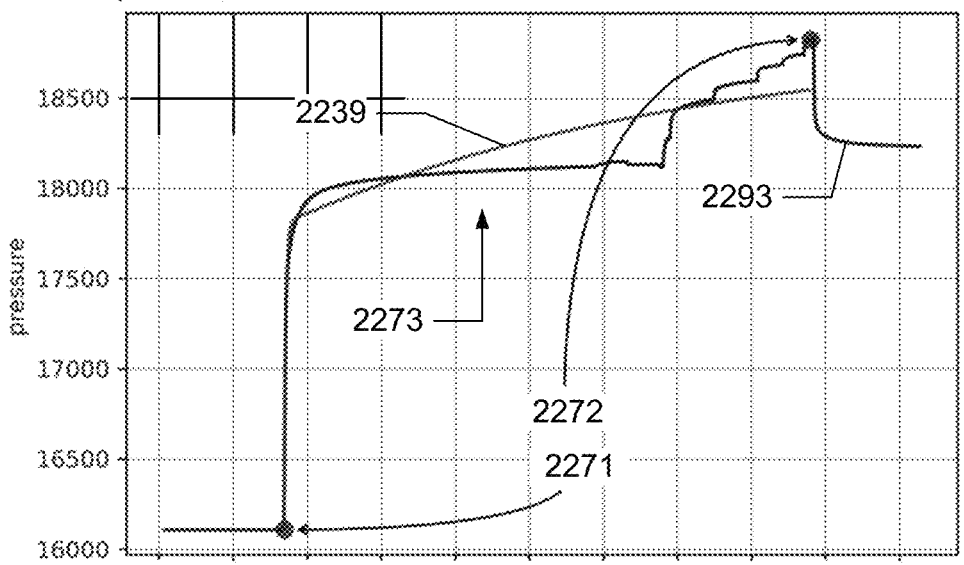

The graph 2297 of FIG. 22 shows a plot 2293 of filtered pressure values (e.g., in psig) along the left vertical axis and time (e.g., in seconds, in minutes, in hours, in days) along the horizontal axis. The graph 2297 shows that there is a start point 2271 of an initial sequence 2273 (a form of a potential shut-in event) and an end point 2272. The start point 2271 and the end point 2272 may have been previously identified by the sequence identification module 537, the splicing module 538, and/or the pressure derivative module 539.

The graph 2297 of FIG. 22 also shows a plot 2239 of a parametric function. In this case, the plot 2239 of the parametric function is positioned over the initial sequence 2273 between the start point 2271 and the end point 2272. In this case, the plot 2239 of the parametric function has significant deviations relative to the initial sequence 2273. As a result, the initial sequence 2273 is rejected as a potential shut-in event and is not recategorized as a fitted sequence. The parametric function module 541 may perform all of these functions. The initial sequence 2273 in this case represents a situation where the master valve of the well 120 is closed just short of full, and then later fully closed. This is another situation that is not a true shut-in, which is why the initial sequence 2273 is not recategorized as a fitted sequence.

Figure 23:
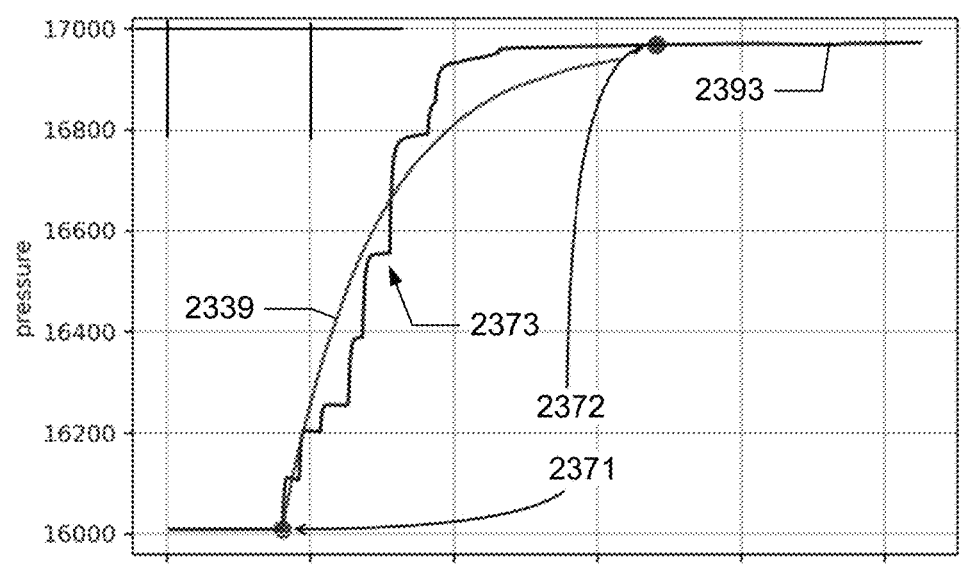

The graph 2397 of FIG. 23 shows a plot 2393 of filtered pressure values (e.g., in psig) along the left vertical axis and time (e.g., in seconds, in minutes, in hours, in days) along the horizontal axis. The graph 2397 shows that there is a start point 2371 of an initial sequence 2373 (a form of a potential shut-in event) and an end point 2372. The start point 2371 and the end point 2372 may have been previously identified by the sequence identification module 537, the splicing module 538, and/or the pressure derivative module 539.

The graph 2397 of FIG. 23 also shows a plot 2339 of a parametric function. In this case, the plot 2339 of the parametric function is positioned over the initial sequence 2373 between the start point 2371 and the end point 2372. In this case, the plot 2339 of the parametric function has significant deviations relative to the initial sequence 2373. As a result, the initial sequence 2373 is rejected as a potential shut-in event and is not recategorized as a fitted sequence. The parametric function module 541 may perform all of these functions.

Returning to the flowchart 658 of FIG. 6, in step 687, pattern recognition is applied to the fitted sequences to generate final sequences. Each pattern used in this step 687 may be or include an algorithm 533. Pattern recognition may be applied to the fitted sequences by the pattern recognition module 542 of the controller 504 of the shut-in identification system 475 using one or more algorithms 533 and/or one or more protocols 532. Each fitted sequence may be compared against a pressure history (a pattern) some period of time (e.g., one day, four hours, a week) before the start point of the fitted sequence. In addition, or in the alternative, each fitted sequence may be compared against a pressure history (a pattern) some period of time (e.g., one day, four hours, a week) after the end point of the fitted sequence.

In certain example embodiments, a fitted sequence is considered to fit a pattern as long as the fitted sequence is within a tolerance (e.g., plus-or-minus 15%, plus-or-minus 35%) of the pattern. In such cases, the tolerance or margin of error allowed can be instantaneous or over periods of time (e.g., running averages every 15 minutes). In any case, if the pattern recognition module 542 determines that a fitted sequence falls outside the pattern, the fitted sequence may no longer be considered to be a potential shut-in event. In addition, or in the alternative, as discussed above, the pattern recognition module 542 may evaluate a fitted sequence by comparing a pressure value (e.g., the highest pressure value, the lowest pressure value, an average of the pressure values) of the fitted sequence to a pressure value (e.g., the highest pressure value, the lowest pressure value, an average of the pressure values) of the entire pressure sequence (i.e., the pressures during the immediately preceding period of time, the fitted sequence, and the immediately subsequent period of time), the immediately preceding period of time, and/or the immediately subsequent period of time relative to some threshold (e.g., within 5%, within 15%).

Pattern recognition in this way is designed to eliminate false positives due to "local" abnormal pressure changes by comparing the fitted sequence, plus the period of time before and/or after the fitted sequence, with the pattern, which defines how the pressure time series should behave before and after a shut-in. The pattern recognition module 542 can determine factors such as, but not limited to, which pattern(s) to apply to a particular fitted sequence, the amount of time before and/or after the fitted sequence to consider, the thresholds and/or tolerances to apply to a particular fitted sequence, and whether a fitted sequence is close enough to a pattern to recategorize the fitted sequence as a final sequence. The pattern recognition module 542 may evaluate a fitted sequence relative to a pattern in real time and/or retroactively.

Figure 24:
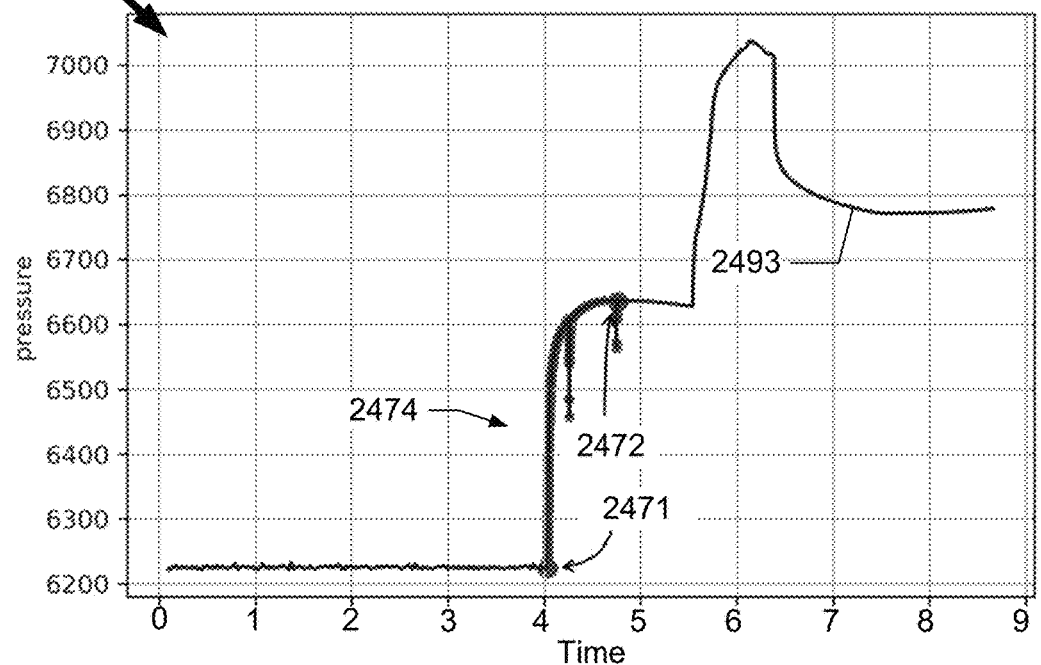
FIGS. 24 through 29 show graphs illustrating pattern recognition according to certain example embodiments.

By way of example of the results generated by the pattern recognition module 542, FIGS. 24 through 29 show graphs illustrating pattern recognition according to certain example embodiments. The graph 2497 of FIG. 24 shows a plot 2493 of filtered pressure values (e.g., in psig) along the left vertical axis and time (e.g., in seconds, in minutes, in hours, in days) along the horizontal axis. The graph 2497 shows that there is a start point 2471 of a fitted sequence 2474 (a form of a potential shut-in event) and an end point 2472. The start point 2471 and the end point 2472 may have been previously identified by the sequence identification module 537, the splicing module 538, and/or the pressure derivative module 539.

The plot 2493 of pressures also includes pressure values for a period of time (in this case, from time 0.1 to time 4.0, where the start point 2471 is located) before the fitted sequence 2474 and for a period of time (in this case, from time 4.8 (where the end point 2472 is located) to time 8.6) after the fitted sequence 2474. In this example, the pattern recognition module 542 may reject the fitted sequence 2474 (i.e., remove the fitted sequence 2474 from among the potential shut-in events) because the pressure values from time 5.5 to time 6.1 show another pressure excursion with pressures higher than those of the fitted sequence 2474.

Figure 25:
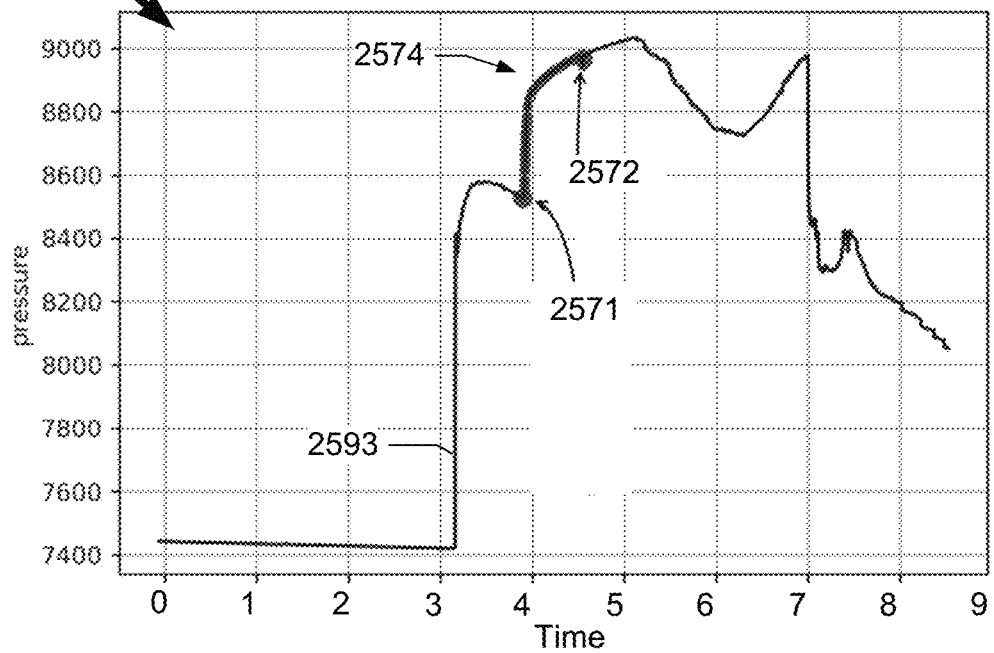

The graph 2597 of FIG. 25 shows a plot 2593 of filtered pressure values (e.g., in psig) along the left vertical axis and time (e.g., in seconds, in minutes, in hours, in days) along the horizontal axis. The graph 2597 shows that there is a start point 2571 of a fitted sequence 2574 (a form of a potential shut-in event) and an end point 2572. The start point 2571 and the end point 2572 may have been previously identified by the sequence identification module 537, the splicing module 538, and/or the pressure derivative module 539.

The plot 2593 of pressures also includes pressure values for a period of time (in this case, from time −0.1 to time 3.9, where the start point 2571 is located) before the fitted sequence 2574 and for a period of time (in this case, from time 4.6 (where the end point 2572 is located) to time 8.6) after the fitted sequence 2574. In this example, the pattern recognition module 542 may reject the fitted sequence 2574 (i.e., remove the fitted sequence 2574 from among the potential shut-in events) because the pressure values from time 3.2 to time 3.9 show another pressure excursion with pressures that lead up to those of the fitted sequence 2574.

Figure 26:
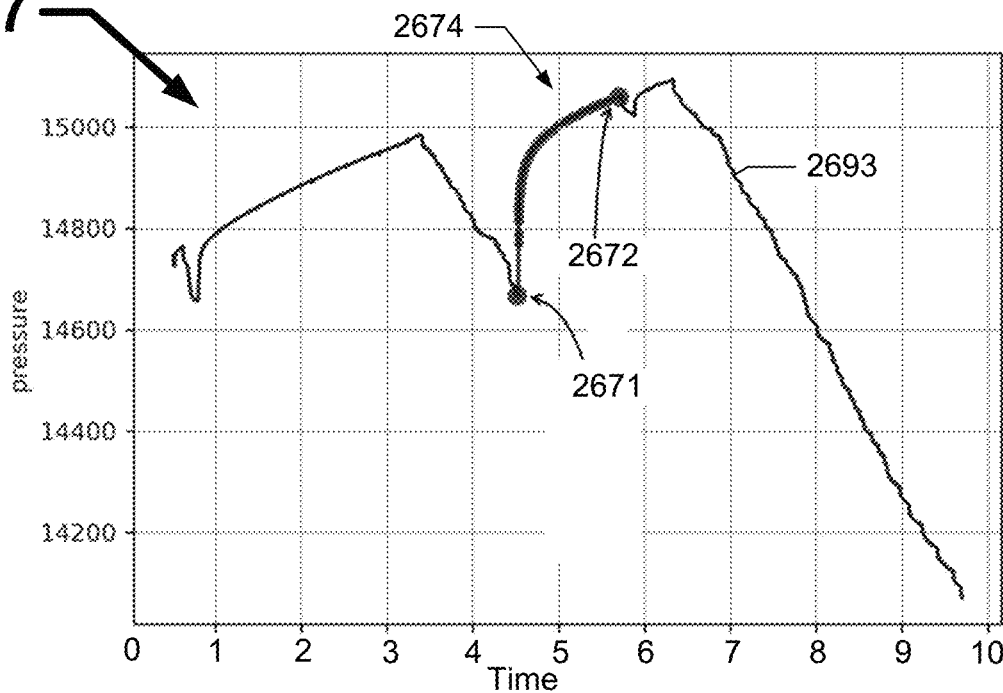

The graph 2697 of FIG. 26 shows a plot 2693 of filtered pressure values (e.g., in psig) along the left vertical axis and time (e.g., in seconds, in minutes, in hours, in days) along the horizontal axis. The graph 2697 shows that there is a start point 2671 of a fitted sequence 2674 (a form of a potential shut-in event) and an end point 2672. The start point 2671 and the end point 2672 may have been previously identified by the sequence identification module 537, the splicing module 538, and/or the pressure derivative module 539.

The plot 2693 of pressures also includes pressure values for a period of time (in this case, from time 0.5 to time 4.4, where the start point 2671 is located) before the fitted sequence 2674 and for a period of time (in this case, from time 5.7 (where the end point 2672 is located) to time 9.7) after the fitted sequence 2674. In this example, the pattern recognition module 542 may reject the fitted sequence 2674 (i.e., remove the fitted sequence 2674 from among the potential shut-in events) because the pressure values from time 0.8 to time 3.3 show another pressure excursion with pressures that are repeated by those of the fitted sequence 2674.

Figure 27:
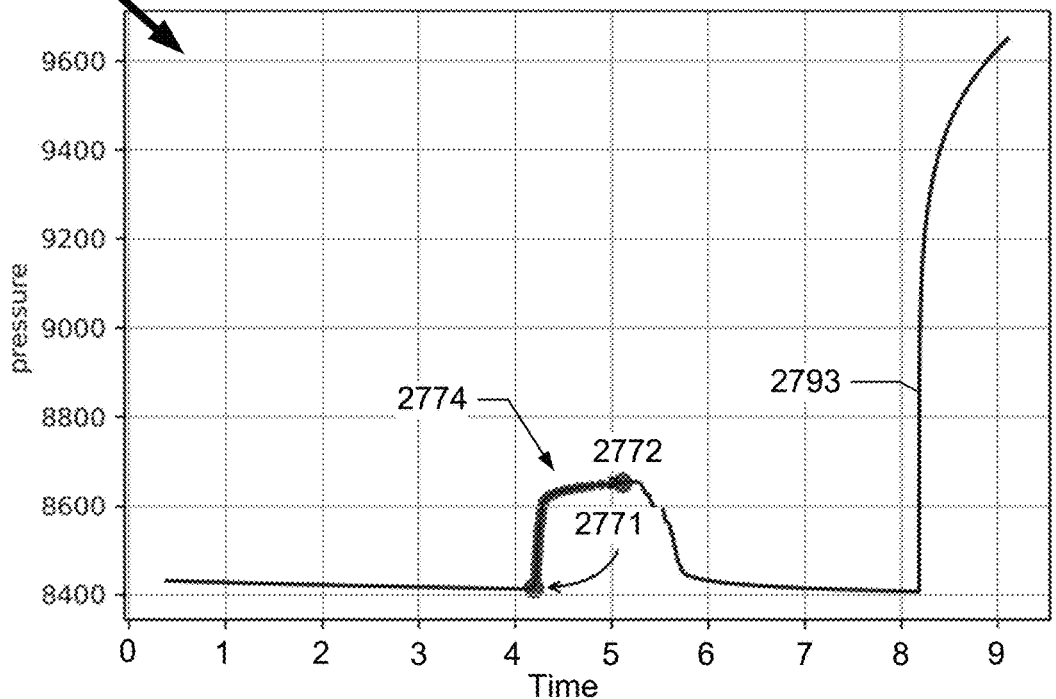

The graph 2797 of FIG. 27 shows a plot 2793 of filtered pressure values (e.g., in psig) along the left vertical axis and time (e.g., in seconds, in minutes, in hours, in days) along the horizontal axis. The graph 2797 shows that there is a start point 2771 of a fitted sequence 2774 (a form of a potential shut-in event) and an end point 2772. The start point 2771 and the end point 2772 may have been previously identified by the sequence identification module 537, the splicing module 538, and/or the pressure derivative module 539.

The plot 2793 of pressures also includes pressure values for a period of time (in this case, from time 0.4 to time 4.2, where the start point 2771 is located) before the fitted sequence 2774 and for a period of time (in this case, from time 5.1 (where the end point 2772 is located) to time 9.1) after the fitted sequence 2774. In this example, the pattern recognition module 542 may reject the fitted sequence 2774 (i.e., remove the fitted sequence 2774 from among the potential shut-in events) because the pressure values of the fitted sequence 2774 are greatly exceeded by the pressures in the event from time 8.2 to time 9.1.

Figure 28:
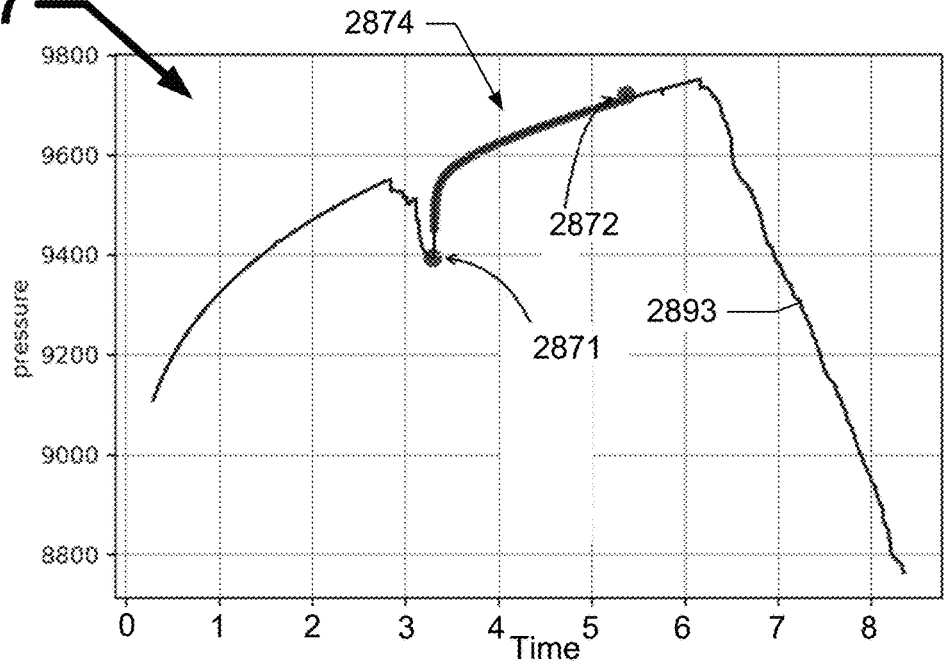

The graph 2897 of FIG. 28 shows a plot 2893 of filtered pressure values (e.g., in psig) along the left vertical axis and time (e.g., in seconds, in minutes, in hours, in days) along the horizontal axis. The graph 2897 shows that there is a start point 2871 of a fitted sequence 2874 (a form of a potential shut-in event) and an end point 2872. The start point 2871 and the end point 2872 may have been previously identified by the sequence identification module 537, the splicing module 538, and/or the pressure derivative module 539.

The plot 2893 of pressures also includes pressure values for a period of time (in this case, from time 0.4 to time 3.2, where the start point 2871 is located) before the fitted sequence 2874 and for a period of time (in this case, from time 5.4 (where the end point 2872 is located) to time 8.4) after the fitted sequence 2874. In this example, the pattern recognition module 542 may reject the fitted sequence 2874 (i.e., remove the fitted sequence 2874 from among the potential shut-in events) because the pressure values from time 0.4 to time 2.8 show another pressure excursion with pressures that are repeated by those of the fitted sequence 2874. As an alternative, the pattern recognition module 542 may refer to the fitted sequence 2874 and the portion of the plot 2893 from time 0.4 to time 2.8 or the start point 2871 to another component of the controller 504 of the shut-in identification system 475 to determine if the combination of those two segments should be identified as a shut-in event.

Figure 29:
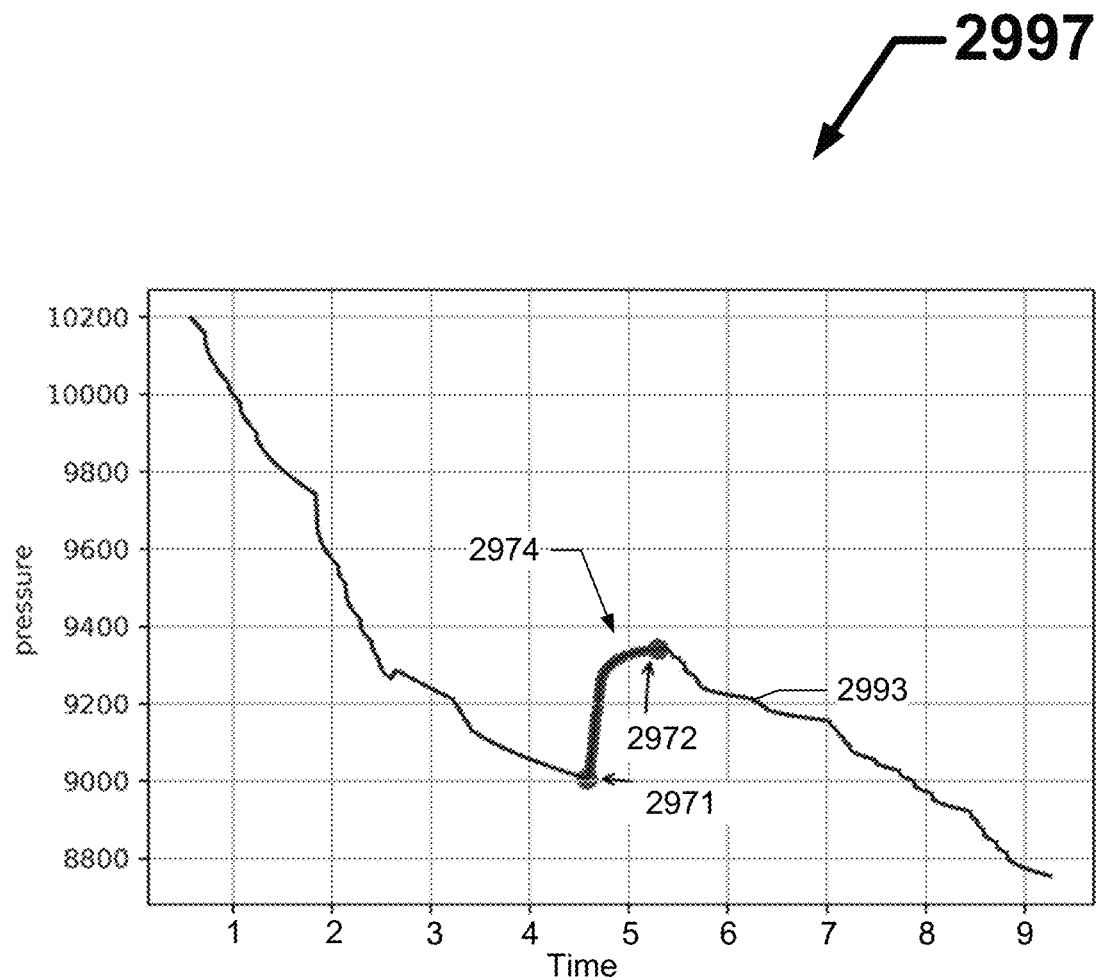

The graph 2997 of FIG. 29 shows a plot 2993 of filtered pressure values (e.g., in psig) along the left vertical axis and time (e.g., in seconds, in minutes, in hours, in days) along the horizontal axis. The graph 2997 shows that there is a start point 2971 of a fitted sequence 2974 (a form of a potential shut-in event) and an end point 2972. The start point 2971 and the end point 2972 may have been previously identified by the sequence identification module 537, the splicing module 538, and/or the pressure derivative module 539.

The plot 2993 of pressures also includes pressure values for a period of time (in this case, from time 0.5 to time 4.6, where the start point 2971 is located) before the fitted sequence 2974 and for a period of time (in this case, from time 5.3 (where the end point 2972 is located) to time 9.4) after the fitted sequence 2974. In this example, the pattern recognition module 542 may reject the fitted sequence 2974 (i.e., remove the fitted sequence 2974 from among the potential shut-in events) because the fitted sequence 2974 appears to be a blip in an otherwise consistent downward trend in pressure values.

Returning to the flowchart 658 of FIG. 6, in step 688, the final sequences are presented. The final sequences may be presented by a controller 504 (or a presenting component thereof), which may include the controller 504 of FIG. 4 above, using one or more algorithms 533, one or more protocols 532, the communication module 507, the transceiver 524, and/or the application interface 526. The final sequences may be presented to a user 451, including an associated user system 455, and/or the network manager 480. In addition, or in the alternative, the final sequences may be requested by a user 451, including an associated user system 455, and/or the network manager 480 may request the final sequences from the controller 504 of the shut-in identification system 475. Some or all of the final sequences may be presented. The final sequences may be presented in one or more of any of a number of suitable means (e.g., as an attachment in an email, on a display, printed in a document).

In step 689, a determination is made as to whether the wellbore operations are continuing. When wellbore operations continue, there may be additional shut-in events that may be identified. The determination may be made by a controller (e.g., controller 404, controller 504) using one or more algorithms 533 and/or one or more protocols 532. The determination may be based, at least in part, on information provided by a user 451, data collected from one or more sensor devices 460, results of one or more algorithms 533, and/or stored data 534 in the storage repository 531. If wellbore operations are continuing, then the process reverts to step 681. If wellbore operations are not continuing, then the process proceeds to the END step.

Figure 30:
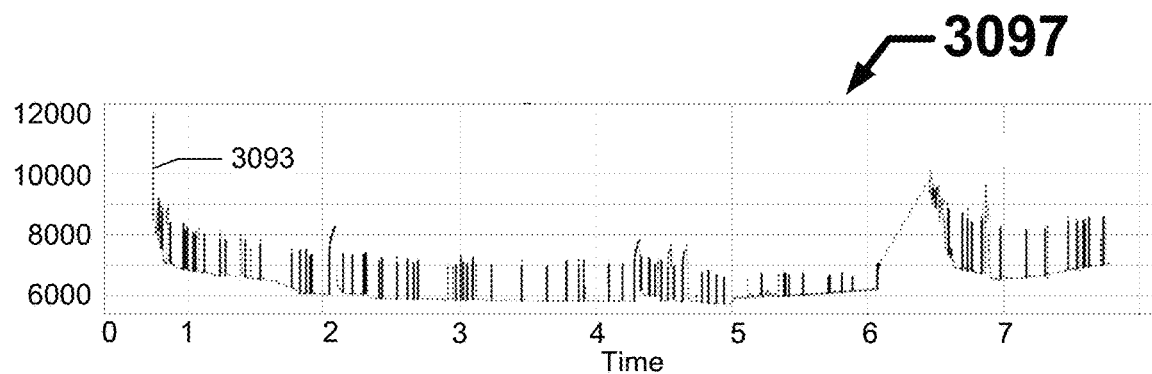
FIGS. 30 through 32 show graphs of long-term pressure profiles of wells for which example embodiments can be used.
Figure 31:
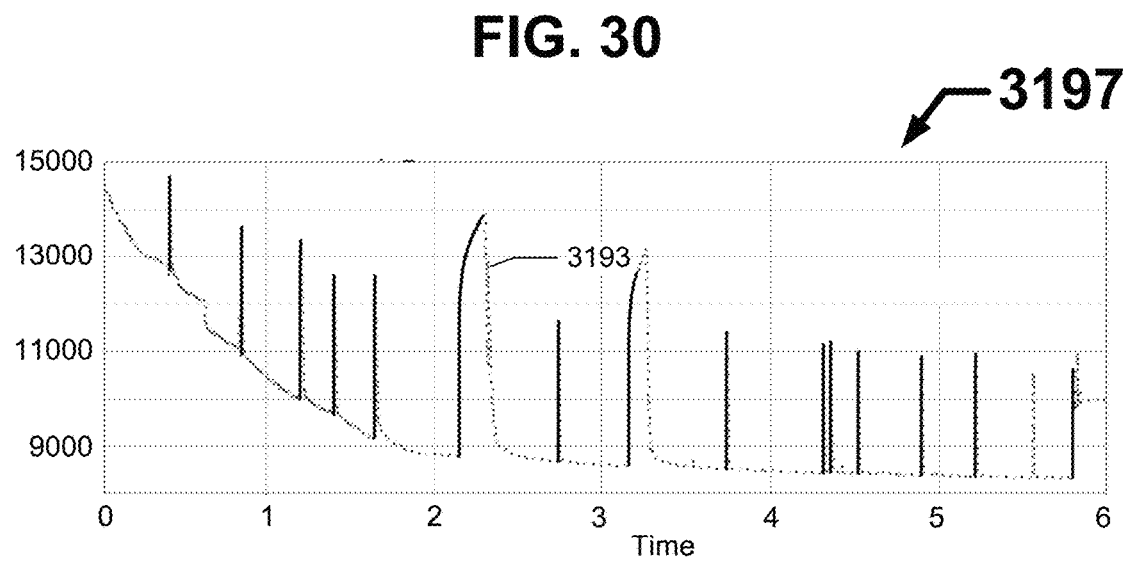
Figure 32:
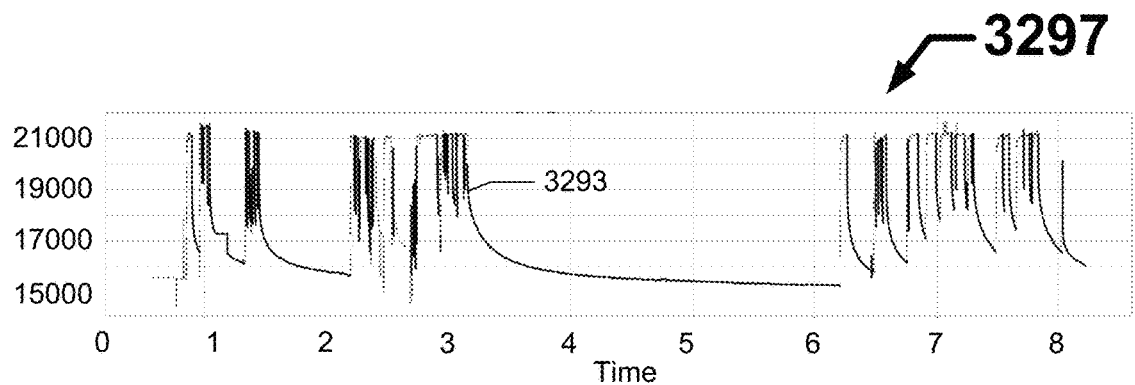

FIGS. 30 through 32 show graphs of long-term pressure profiles of wells for which example embodiments can be used. Referring to FIGS. 1A through 32, the graph 3097 of FIG. 30 shows a plot 3093 of filtered pressure values (e.g., in psig) along the vertical axis and time (in this case, in 6 month increments) along the horizontal axis. The graph 3097 shows pressures for a production well, and so the shut-in events (shown in solid line within the plot 3093 as opposed to a dashed line) that are identified are when the pressure spikes or otherwise increase.

The graph 3197 of FIG. 31 shows a plot 3193 of filtered pressure values (e.g., in psig) along the vertical axis and time (in this case, in 2 month increments) along the horizontal axis. The graph 3197 shows pressures for a production well, and so the shut-in events (shown in solid line within the plot 3193 as opposed to a dashed line) that are identified are when the pressure spikes or otherwise increase. The graph 3297 of FIG. 32 shows a plot 3293 of filtered pressure values (e.g., in psig) along the vertical axis and time (in this case, in 6 month increments) along the horizontal axis. The graph 3297 shows pressures for an injection well, and so the shut-in events (shown in solid line within the plot 3293 as opposed to a dashed line) that are identified are when the pressure spikes or otherwise decrease.

Example embodiments may be used to identify actual or true shut-in events for a well. Example embodiments may be used to fully or partially automate the process of identifying shut-ins in a more accurate manner and in a significantly shorter amount of time. Example embodiments may also communicate the identified shut-in events efficiently and more in real time. Example embodiments may provide a number of benefits. Such benefits may include, but are not limited to, ease of use, extending the life of a producing well, flexibility, configurability, and improved compliance with applicable industry standards and regulations.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for identifying shut-ins of a well, the system comprising a controller that is configured to:
    obtain a plurality of raw pressure values measured by a sensor device located toward a bottom hole of the well and captured over a period of time, wherein each of the plurality of raw pressure values indicates a pressure at the bottom hole of the well during the period of time;
    apply, using a filter module of the controller and in real time, a plurality of filters to the plurality of raw pressure values to generate a plurality of filtered pressure values;
    identify, using a sequence identification module of the controller and in real time, a plurality of initial sequences comprising monotonically trending values among the plurality of filtered pressure values, wherein each of the plurality of initial sequences comprises a start point and an end point;
    splice, using a splicing module of the controller and in real time, adjacent initial sequences among the plurality of initial sequences, wherein the splicing module joins the end point of a prior adjacent initial sequence with the start point of a subsequent adjacent initial sequence into a single initial sequence when the prior adjacent initial sequence has a slope that is greater than that of the subsequent adjacent initial sequence;
    adjust, in real time, the start point of at least one of a plurality of final initial sequences based on derivatives of the filtered pressure values, wherein the plurality of final initial sequences comprises the single initial sequence after splicing and the plurality of initial sequences without splicing;
    apply, in real time, a parametric function to the plurality of final initial sequences to generate a plurality of fitted sequences, wherein the plurality of fitted sequences comprises the plurality of final initial sequences excluding final initial sequences falling outside a tolerance of the parametric function; and
    apply, in real time, pattern recognition to the plurality of fitted sequences to generate a plurality of final sequences, wherein the plurality of final sequences comprises the plurality of fitted sequences excluding fitted sequences falling outside a tolerance of the pattern recognition, wherein the plurality of final sequences captures an actual shut-in event and omits a false positive indication of a shut-in event, and wherein the plurality of final sequences is used in real time for at least one of a group consisting of modifying petroleum engineering workflows that are used to characterize productivity of the well, modifying surveillance, analysis and optimization of the well, and satisfying regulatory and reporting requirements related to the well.

2. The system of claim 1, wherein the sensor device is part of the system.

3. A non-transitory computer readable medium comprising computer readable program code, which when executed by a computer processor, enables the computer processor to:
    facilitate applying a plurality of filters in real time to a plurality of raw pressure values to generate a plurality of filtered pressure values, wherein the plurality of raw pressure values represent pressures at a bottom hole of a well over a period of time, wherein each of the plurality of raw pressure values are measured by a sensor device located toward a bottom hole of the well and captured over a period of time, and wherein each of the plurality of raw pressure values indicates a pressure at the bottom hole of the well during the period of time;
    facilitate identifying, in real time, a plurality of initial sequences comprising monotonically trending values among the plurality of filtered pressure values, wherein each of the plurality of initial sequences comprises a start point and an end point;
    facilitate splicing, in real time, adjacent initial sequences among the plurality of initial sequences, wherein splicing comprises joining the end point of a prior adjacent initial sequence with the start point of a subsequent adjacent initial sequence into a single initial sequence when the prior adjacent initial sequence has a slope that is greater than that of the subsequent adjacent initial sequence;
    facilitate adjusting, in real time, the start point of at least one of a plurality of final initial sequences based on derivatives of the filtered pressure values, wherein the plurality of final initial sequences comprises the single initial sequence after splicing and the plurality of initial sequences without splicing;
    facilitate applying, in real time, a parametric function to the plurality of final initial sequences to generate a plurality of fitted sequences, wherein the plurality of fitted sequences comprises the plurality of final initial sequences excluding final initial sequences falling outside a tolerance of the parametric function; and
    facilitate applying, in real time, pattern recognition to the plurality of fitted sequences to generate a plurality of final sequences, wherein the plurality of final sequences comprises the plurality of fitted sequences excluding fitted sequences falling outside a tolerance of the pattern recognition, wherein the plurality of final sequences captures an actual shut-in event and omits a false positive indication of a shut-in event, and wherein the plurality of final sequences is used in real time for at least one of a group consisting of modifying petroleum engineering workflows that are used to characterize productivity of the well, modifying surveillance, analysis and optimization of the well, and satisfying regulatory and reporting requirements related to the well.

4. The non-transitory computer readable medium of claim 3, wherein the computer readable program code, which when executed by a computer processor, further enables the computer processor to:
    facilitate presenting an output of the plurality of final sequences.

5. The non-transitory computer readable medium of claim 3, wherein the plurality of filters comprises a wavelet filter and a moving average filter.

6. The non-transitory computer readable medium of claim 3, wherein the monotonically trending values are increasing when the well is in production.

7. The non-transitory computer readable medium of claim 3, wherein the monotonically trending values are decreasing during injection of fluids into the well.

8. The non-transitory computer readable medium of claim 3, wherein splicing the adjacent initial sequences is subject to a time tolerance.

9. The non-transitory computer readable medium of claim 3, wherein the derivatives of the filtered pressure values are used to identify a build up in pressure when the well is in production and a fall off in the pressure during injection of fluids into the well.

10. The non-transitory computer readable medium of claim 9, wherein the build up in the pressure is identified when a first threshold value is exceeded in a positive direction and the fall off in the pressure is identified when a second threshold value is exceeded in a negative direction.

11. The non-transitory computer readable medium of claim 10, wherein the first threshold value and the second threshold value are based on a formation in which the well is located.

12. The non-transitory computer readable medium of claim 3, wherein the parametric function comprises an exponential component.

13. The non-transitory computer readable medium of claim 3, wherein the parametric function is configured to approximate an actual shut-in.

14. The non-transitory computer readable medium of claim 3, wherein applying the pattern recognition to the plurality of fitted sequences is configured to remove pressure changes due to a field operation unrelated to a shut-in from the plurality of final sequences.

15. The non-transitory computer readable medium of claim 3, wherein applying the pattern recognition to each of the plurality of fitted sequences considers a period of time that begins prior to the fitted sequence and ends after the fitted sequence.

* * * * *